(12) United States Patent
Vidal et al.

(10) Patent No.: US 8,538,402 B2
(45) Date of Patent: Sep. 17, 2013

(54) PHONE THAT PREVENTS TEXTING WHILE DRIVING

(76) Inventors: Joel Vidal, New York, NY (US); Yael Vidal, New York, NY (US)

( * ) Notice: Subject to any disclaimer, the term of this patent is extended or adjusted under 35 U.S.C. 154(b) by 0 days.

(21) Appl. No.: 13/371,462

(22) Filed: Feb. 12, 2012

(65) Prior Publication Data

US 2013/0210406 A1 Aug. 15, 2013

(51) Int. Cl.
*H04W 88/02* (2009.01)

(52) U.S. Cl.
USPC ........................................................ 455/418

(58) Field of Classification Search
USPC .............. 455/418, 411, 414.1, 425, 405, 567, 455/210.02, 415; 379/207.13–207.16, 201.01
See application file for complete search history.

(56) References Cited

U.S. PATENT DOCUMENTS

2010/0323615 A1 * 12/2010 Vock et al. ................... 455/26.1

* cited by examiner

*Primary Examiner* — Diane Mizrahi

(57) ABSTRACT

The present invention includes a phone able to detect or determine that a user of the phone is sitting in a driver seat of a moving vehicle. The determination may be based on, for example, captured front-side images, captured back-side images, captured audio, contextual analysis of textual messages, contextual analysis of phone conversations or intra-vehicular conversations, GPS data or other location data, or other parameters. Upon such determination, the phone may block one or more features or applications, such as texting or messaging. The present invention may reduce, eliminate or block occurrences of concurrent texting-and-driving, or other unsafe or illegal operations.

20 Claims, 13 Drawing Sheets

REAR-LEFT SEAT

REAR-RIGHT SEAT

REAR-CENTER SEAT

RIGHT-SIDE SEAT

PHONE THAT PREVENTS TEXTING WHILE DRIVING

FIELD

Some embodiments are related to the field of wireless communication.

BACKGROUND

Many people use cellular phones in order to make and receive phone calls. For example, a user may utilize a cellular phone in order to talk with friends, stay in touch with family members, and transact business with co-workers and business associates while being away from the user's home or office.

Many users utilize a smartphone, which may include features of a cellular phone as well as features of a Personal Digital Assistant (PDA). For example, a smartphone may be used for placing and receiving phone calls, as well as for browsing the Internet, taking photographs by utilizing an integrated camera, playing games, sending and receiving electronic mail (email), maintaining a calendar or schedule, or the like.

SUMMARY

Some embodiments may include, for example, a phone that prevents, blocks and/or detects concurrent texting and driving, or texting while the phone user is seated in a vehicular driver's seat (e.g., and not in a vehicular passenger seat), or while the phone user is seated in a vehicular driver's seat while the vehicle is moving.

Some embodiments may prevent, block, eliminate, reduce and/or report occurrences of texting-while driving, mailing-while-driving, browsing the Internet while driving, or performing other unsafe and/or illegal phone-related operations while driving, or while seating in a driver's seat of a moving vehicle.

Some embodiments may include, for example, a phone able to detect or determine that a user of the phone is sitting in a driver seat of a moving vehicle. The determination may be based on, for example, captured front-side images, captured back-side images, captured audio or speech, contextual analysis of textual messages, contextual analysis of phone conversations or intra-vehicular conversations, contextual analysis of a thread of messages, GPS data or other location data, and/or other parameters which may be fused or weighted.

Upon such determination, the phone may block one or more features or applications, such as texting, messaging, composing messages, emailing, browsing the Internet, typing, or other features or applications.

Some embodiments may reduce, eliminate or block occurrences of concurrent texting-and-driving; may automatically penalize or report a phone user who concurrently drives-and-texts; and/or may automatically reward a phone user who continuously refrains from concurrent texting-and-driving.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION OF SOME EMBODIMENTS

Figure 1A:
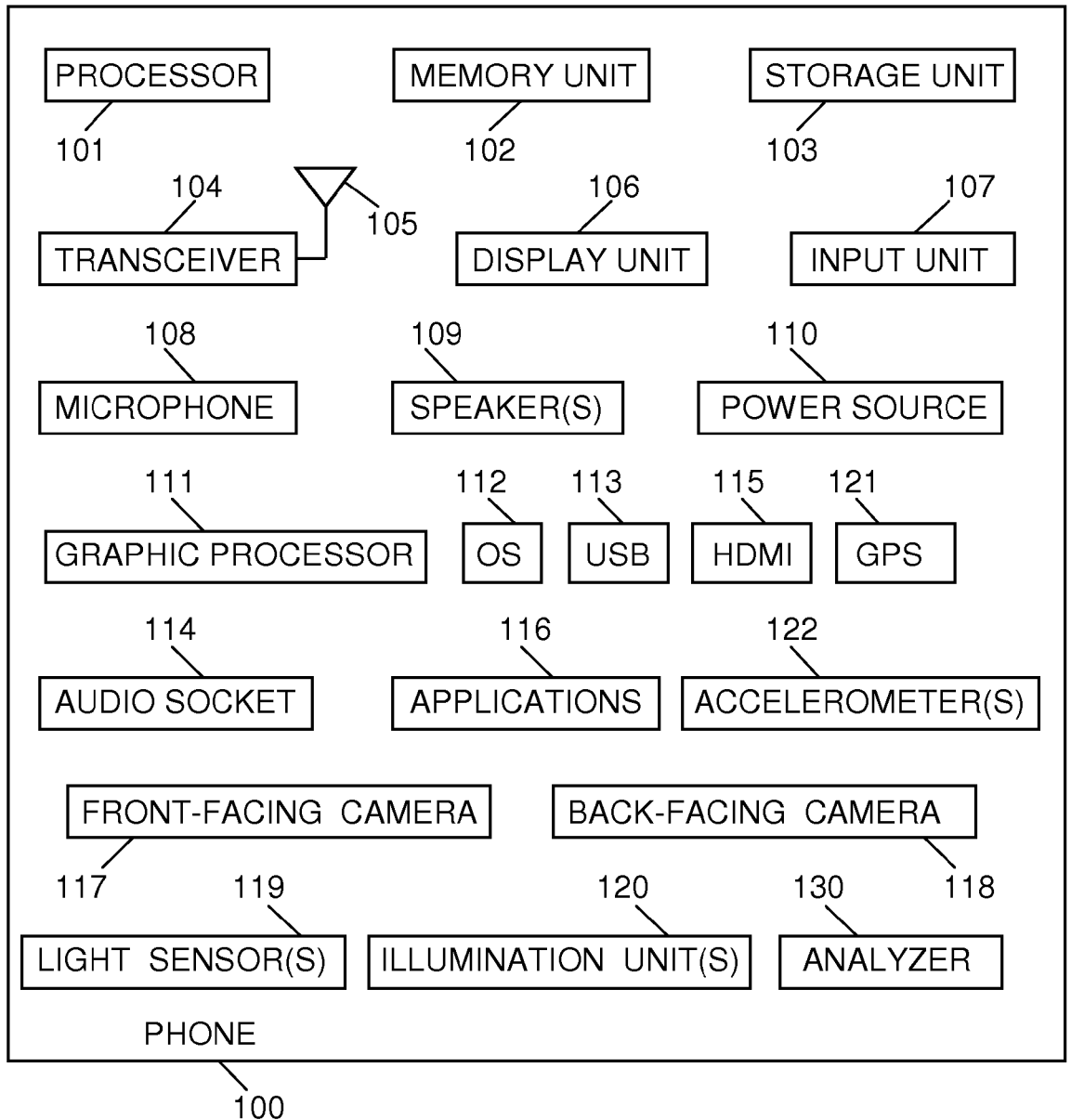
FIG. 1A is a schematic block diagram illustration of a phone, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

The term "phone" as used herein may include, for example, a cellular phone, a cellphone, a smartphone (e.g., Apple iPhone, an Android-based smartphone or device, a Blackberry device, a Microsoft Windows based smartphone), a cordless phone (e.g., typically used in homes), a DECT phone, a mobile phone, a corded phone, a wireless communication device, or the like. Optionally, the term "phone" may include, for example, a tablet (e.g., Apple iPad, Motorola Xoom), a tablet computer, a tablet device, a handheld device, a portable device, an electronic device, a portable electronic device, an electronic book reader or e-book reader (e.g., Amazon Kindle, Barnes & Noble Nook), a device able to send and/or receive phone calls, a device able to send and/or receive text messages and/or SMS messages and/or MMS messages and/or Instant Messages, a gaming device, a portable or handheld gaming device (e.g., Sony PlayStation Portable), or the like.

Some embodiments may include, for example, a phone which prevents its user from performing one or more operations via the phone, while the user is seated in a vehicular driver seat; or, while the user is seated in a driver seat of a moving vehicle or of an accelerating vehicle or of a decelerating vehicle.

The inventors have realized that in it may not suffice to merely estimate that a phone is located within a moving vehicle, in order to block or disallow one or more features of the phone (e.g., texting or emailing); as this approach may often result in a "false positive", in which a vehicular passenger (who is not the vehicular driver) may be incorrectly blocked or prevented from using such features in the passenger's phone, even though the passenger is not driving or operating the vehicle. The inventors have realized that in order to eliminate such "false positives", and in order to provide an effective solution that prevents, reduces or eliminates the unsafe and/or illegal practice of texting-and-driving or emailing-and-driving or browsing-and-driving, it may be beneficial and advantageous to determine whether or not the phone is utilized by a driver or by a non-driver (e.g., passenger) in a moving vehicle.

The phone may be able to automatically and/or autonomously determine: whether or not the phone user is within a vehicle; and/or whether or not the phone user is seated in a driver seat of a vehicle; and/or in which seat of a vehicle the phone user is seated; and/or in which seat of a vehicle the phone user is surely not seated; and/or in which row of a vehicle (e.g., front row or back row; or front row, second row, third row) the phone user is seated; and/or in which row of a vehicle the phone user is surely not seated; or the like.

For example, the phone may automatically and/or autonomously capture one or more photographs and/or videos, by using a front-side camera or front-facing camera of the phone, and/or by using a back-side camera or back-facing camera of the phone. Based on an analysis of the captured photographs and/or videos, the phone may reach the above-mentioned determination(s).

The phone may capture photographs and/or video periodically (e.g., every 30 seconds); or, upon occurrence of a pre-defined triggering event, for example, upon the user opening or launching a texting application or an email application or a "contacts" application; or upon performance by the user of one or more gestures and/or commands, or upon receiving a user command to compose a new text message or to compose a new email message, or to respond to a text or email message.

In some embodiments, the phone may reach one or more of the above-mentioned determination, about the particular seating of the phone user within a vehicle, by analyzing captured photographs and/or videos and recognizing or determining a location and/or a size (or, a relative location, a relative size, a slanting, a position, a relative position, or the like) of, for example: a vehicular steering wheel; a vehicular front window or windshield; a vehicular back window or windshield; a vehicular left-door front-side window or windshield; a vehicular right-door front-side window or windshield; a vehicular left-door backrow-side window or windshield; a vehicular right-door backrow-side window or windshield; a vehicular rear window or windshield; a vehicular left-side side-mirror; a vehicular right-side side-mirror; a vehicular internal mirror typically located at the top center of the front windshield; a vehicular stick-shift or gear-shift (which may be manual and/or automatic); a vehicular clock or watch; a vehicular speedometer; a vehicular gas meter or fuel meter; a vehicular dashboard; one or more vehicular air conditioning outlet(s); one or more vehicular air conditioning control buttons; one or more buttons or components (e.g., disk tray or disk slot) of a vehicular music player or a vehicular audio player or a vehicular CD player (which is typically located front-right to the driver seat) or a vehicular DVD player or a vehicular screen or monitor; a vehicular screen or monitor which displays the field-of-view captured by a vehicular camera facing the back (e.g., typically used when the vehicle is in Reverse and/or moving backwards); a vehicular dashboard component, for example, a button, a stick, a warning message, a notification message; a vehicular gas pedal and/or brake pedal and/or clutch pedal; a vehicular hand-brake; a vehicle manufacturer logo or name which may appear on a vehicular steering wheel; a vehicular seat or head-rest or cushion; vehicular components that are typically located on the internal side of a driver-side door (e.g., four buttons that control four windows of the vehicle; a button that locks all doors; a button that locks all windows); vehicular components that are typically located on the internal side of a passenger-side door (e.g., a singular window control button); vehicular components that are typically located on a vehicular steering wheel (e.g., cruise control buttons or components; steering wheels buttons that control the vehicular audio player or music player or CD player); and/or other vehicular items or components.

The phone may be able to automatically and/or autonomously determine: whether or not the user is within a vehicle; and/or whether or not the vehicle is moving; and/or whether or not the vehicle is static or stationary or non-moving or parked; and/or whether or not the vehicle is accelerating; and/or whether or not the vehicle is decelerating; and/or whether or not the vehicular engine is running.

For example, the phone may automatically and/or autonomously utilize location-based or location-aware components or modules of the phone, such as, a Global Positioning System (GPS) component or receiver or transceiver or module; and/or location information provided by a cellular network operator; and/or location information that the phone is able to obtain from other sources (e.g., wireless network(s), Wi-Fi network(s), Wi-Max network(s), cellular network(s), or the like). Based on multiple location readings or location data, the phone may deduce that the vehicle is generally moving; for example, if at time 8:12:34 AM the phone was located at a particular geo-spatial location, and at 8:12:36 AM the phone was located at another geo-spatial location which is approximately 34 meters away from the previous geo-spatial location, thereby indicating movement, or rapid movement that is not typical of a pedestrian walking (or, is at a speed which is impossible for a pedestrian to reach) but rather is more typical of a rapidly-moving car or of a moving car.

In other embodiments, the phone may automatically and/or autonomously determine the above-mentioned conclusions about movement of the phone (and a vehicle in which the phone is located) by using data from an accelerometer of the phone. For example, the accelerometer of the phone may indicate that the phone accelerates or decelerates, in general, or in particular rates that are more typical of a vehicle and are less typical (or are impossible) for a pedestrian or even a running person.

In some embodiments, once the user requests to compose, or while the user is composing, a text message or an email message or other type of message or communication, the phone may automatically and/or autonomously capture one or more photographs and/or videos, using the front-facing camera and/or the back-facing camera of the phone.

The phone may automatically and/or autonomously determine that a photograph, captured by the back-facing camera of the phone, includes a steering wheel (or a portion thereof; or another vehicular component) shown from an angle that is typical only if the phone user is seated in the driver seat, and not in a non-driver seat of the vehicle. For example, a back-facing camera of a phone, held by a vehicular driver, may capture a photographs which clearly shows the steering wheel (or portions thereof) up-close, or occupying a significant portion or percentage of the captured photograph or field-of-view (e.g., over 50 percent thereof), or showing the steering wheel directly in front of the camera that took the photographs. In contrast, a back-side camera of a phone, that is held by a passenger seating in the front row of the vehicle but not in the driver seat, may not show the steering wheel at all; or may show it from a distance and thus at an angel, or may show it slanted or at the side of the photograph. Similarly, a back-side camera of a phone, that is held by a passenger seating in the back row of the vehicle, may not show the steering wheel at all; or may show it from a distance and thus at an angel, or may show it slanted or at the side of the photograph, or the like.

Other vehicular components, or "anchors", may be used by the phone for image analysis and/or video analysis. For example, a photograph captured by the back-side camera of the phone, may clearly show the speedometer, or the gas meter or fuel meter, or the left-side of the stick-shift, or the dashboard indicator which shows which gear is used (e.g., "D" for Drive or "P" for "Park"); and the phone may thus determine that the user of the phone is seated in a vehicular driver seat.

In some embodiments, photographs and/or videos captured by a front-facing camera of the phone may be used for analysis in order to determine the seating of the phone user, or in order to determine whether or not the phone user is seated in the driver seat. For example, a photograph or video captured by a front-facing camera of the phone may show a user having a buckled-up seat-belt which covers a portion of the right side of the user's shoulder, thereby indicating that the user is seated on a right side of the vehicle and not on the left side. Optionally, GPS information or other location information may indicate that the phone is located in the United States, such that a vehicular driver seat is on a left side of a vehicle (or, this information may otherwise be configured or provided to the phone, manually or automatically), thereby indicating that the phone user having the seat belt over his right shoulder is not the driver of the vehicle (but rather, either a front-row right-side passenger, or, a back-row right-side passenger).

In some embodiments, the analysis may take into account photographs and/or videos captured by both front-facing and back-facing cameras of the phone, in order to reach a correct conclusion, or in order to verify or reassure (or contradict, or deny) that the conclusion reached (or that a temporary conclusion or a candidate conclusion) is correct (or is incorrect). For example, a front-facing camera of the phone may capture a photograph showing the phone user having a seat-belt over his left shoulder; thereby indicating that the phone user is seated either in the driver seat, or in a back-row left-side seat, and thereby "eliminating" right-side passengers as possible phone users. In some embodiments, further narrowing-down and determination may be reached by taking into account another photograph or video, captured by the back-facing camera of the phone, which shows clearly a vehicular steering wheel (or a portion thereof), or which shows a vehicular speedometer: these vehicular components are typically not visible by a passenger seating in the left-side back row, behind the driver seat, as the driver seat and the driver typically block these vehicular components from being viewed by a left-side back-row passenger; and thus a determination may be reached that the phone user is seated in a vehicular driver seat.

In some embodiments, the image and/or video analysis may take into account images and/or footage that captures items or scenes or scene components that are extra-vehicular or external to the vehicle, for example, street view, trees, houses, other cars, or the like. For example, a front-row passenger may hold his phone in his right hand, such that the back-facing camera may clearly capture the right-side window of the front-right passenger door; and optionally, may even capture through that window an image of a nearby car in which another driver is shown, thereby indicating that the phone user is indeed a front-row passenger and not a driver.

In some embodiments, for example, the back-side camera may capture images and/or videos of vehicular traffic, which is facing the phone, or which travels downward in the video or towards the phone. Such captured images and/or videos indicate that the vehicular traffic captured is in the opposite direction to the current driving direction, and this may be more typical of images and/or videos captured by a driver-seat phone user who is closer (relative to a right-side front-row passenger) to opposite traffic which is typically on the left side of the vehicle. Similarly, for example, the back-side camera may capture images and/or videos of vehicular traffic, which is facing or moving away from the phone, or which travels upward in the video or away or ahead of the phone. Such captured images and/or videos indicate that the vehicular traffic captured is in the same direction to the current driving direction; and this, optionally together with other data (e.g., location or shape or angel of window frame, or seat-belt direction) may be used in order to determine whether or not the phone user is seated in a vehicular driver seat.

In some embodiments, a weighted system or a point-based system may be used in order to reach such determination. For example, in order to reach a conclusion that the phone user is in a driver seat, at least 20 points need to be accumulated by the phone's analysis module. In some embodiments, a photograph captured by the back-side camera of the phone, which clearly shows a large and significant and direct image of a vehicular steering wheel, may be associated with 25 points. In some embodiments, a partial image of a steering wheel may be associated with 10 points. In some embodiments, a clear image of a speedometer may be associated with 8 points. An image of driver's door components (e.g., four control buttons that control all windows in the car) may be associated with 15 points, or with 24 points. Analysis of one or more photographs and/or videos may thus aggregate points, and may reach a determination or conclusion accordingly.

Optionally, some identified image components or video components may contribute negative points. For example, a clear and direct image of a vehicular glove compartment (in a closed position, or in an open position), may be associated with a value of −15 (negative fifteen) points or −23 (negative twenty three) points. Similarly, a photograph or video captured by a front-side camera of the phone, showing a seatbelt over the right shoulder of the phone user, may have a value of −16 points, or a value of −22 points, or the like.

In some embodiments, one or more identified components may be associated with a prevailing weight, or other type of overriding value or weight, which forces the analysis to reach a particular conclusion. For example, in some embodiments, a front-side photograph which clearly shows the phone user having a seatbelt over his right shoulder and not over his left shoulder, may be a prevailing factor or criterion which necessarily reaches a conclusion that the phone user is not seated in a vehicular driver seat; and this determination may be held even if other image components, such as, visibility of portions of the dashboard and/or steering wheel and/or audio player, might have indicated towards an opposite conclusion (namely, that the phone user may be seated in the driver seat).

In some embodiments, the phone may utilize analysis (e.g., contextual analysis) of typed text and/or typed messages and/or typed communications (e.g., email messages), in order to determine that the phone user is seated in a driver seat and/or in a moving vehicle. For example, the phone use may compose a text message or an email, e.g., by typing on a virtual keyboard or an on-screen keyboard; by dictating speech that is converted to text; by swiping a finger over characters in a virtual or on-screen keyboard, or by pressing keys of a physical keyboard of the phone (e.g., integrated under the screen of the phone, or a "slider" sliding keyboard). The composed message may be, for example, "I am driving there right now, will be there in five minutes". The phone may analyze the composed text, while it is being composed, or after it was composed but not yet sent out, or after it was composed and also sent out. The analysis may indicate that the phone user is currently driving in a vehicle; either by deducing this conclusion from the merits of the message, or optionally, by crossing such candidate conclusion with additional information, for example, GPS data or other location information which indicates that the phone is indeed moving (e.g., generally moving, or moving at a velocity that is indicative of a motor vehicle and not of a pedestrian). Upon reaching such conclusion, the phone may take one or more actions, for example, deny the sending out of the composed message (if it was not yet sent out); or deny further utilization of a texting or email application, for a pre-defined time (e.g., for ten minutes), or for a time-period deduced from the contextual analysis (e.g., for a period of five minutes, based on the composed message in which the user estimated that he will continue to drive for five more minutes), or until the phone determines that the user is no longer driving and/or moving (e.g., at all, or for a period of time, such as, for at least 45 seconds, or for at least 120 seconds; optionally by utilizing GPS data or other location data for such determination).

In some embodiments, the phone may monitor incoming and/or outgoing communications (e.g., textual communications, typed communications, uttered or spoken communications, or the like) for the purpose of such contextual analysis, which may optionally take into account a thread (or a portion of a thread) of multiple communications, and which may be used for determining whether or not the phone user is driving a vehicle and/or is within a moving vehicle. For example, a friend may send a text message (or email) to the phone user, at 4:37:05 PM, "Are you driving to me now?"; and the user may respond by text (or email), from the phone, at 4:37:18 PM, "Yes". The contextual analysis of the phone may span a batch or thread of messages, in order to deduce that the phone user is driving a vehicle and/or is within a moving vehicle.

In some embodiments, the phone may monitor cellular phone conversations (e.g., between the phone user and a remote party with whom the phone user talks by utilizing the phone), in order to determine whether deduce that the phone user is driving a vehicle and/or is within a moving vehicle; or in order to deduce one or more parameters or data items which the phone may take into account for determining whether the phone user is driving a vehicle and/or is within a moving vehicle. For example, the phone may monitor in real time an ongoing cellular conversation; the phone may determine that the phone user (and not the remote party) uttered the phrase "I am now on my way to work" or "I am driving now to work"; may perform a contextual analysis which may indicate that the phone user, most probably, is in motion and/or is driving, based on the content of the uttered phrase; optionally, may cross the contextual analysis result with other data, for example, GPS data or location data which may indicate that the phone is moving (e.g., generally, or at a velocity indicative of a moving motor vehicle and not a pedestrian); and the phone may thus deduce that the phone user is driving a vehicle and/or is within a moving vehicle.

In some embodiments, the phone may monitor non-cellular conversations, for example, by capturing audio (e.g., ambient audio, background audio, or the like) using a microphone or other audio-capturing component of the phone. For example, the microphone of the phone may be activated autonomously and/or automatically by the phone, with or without letting the phone user know about the microphone activation; and the microphone of the phone may capture a background conversation between two or more person. Based on the level of the volume (and/or the pitch, and/or the tone, and/or other audio parameters) of the various spoken phrases and/or speakers, the phone may deduce that one speaker is probably the phone user (e.g., because his utterances sound louder, due to his proximity to his phone), whereas another speaker is probably a person who is not the user of that phone (e.g., because her utterances sound less loud, or more remote, due to her proximity from that phone). The phone may then convert the utterances from speech to text, and may perform contextual analysis on the text. For example, the phone may deduce that the person who is presumed to be the phone user, has just said to the other person, "we are almost there, let me just turn left on Cedar Lane", or "We still have about ten minutes of driving, I now take the highway", or "do you think that I should take the highway or the service road?"; and based on contextual analysis, the phone may deduce that the phone user is in motion and/or is driving, based on the content of the uttered phrase(s); optionally, the phone may cross the contextual analysis result with other data, for example, GPS data or location data which may indicate that the phone is moving (e.g., generally, or at a velocity indicative of a moving motor vehicle and not a pedestrian); and the phone may thus deduce that the phone user is driving a vehicle and/or is within a moving vehicle.

Once the phone deduces that the phone user is seating in a driver seat of a vehicle; or optionally, once the phone deduces cumulatively that the phone user is seating in a driver seat of a vehicle and that the vehicle is moving, then, the phone may take one or more actions, and/or the phone may prevent the phone user from performing one or more actions, and/or the phone may block or deny or un-authorize or disallow the phone user from performing one or more actions via the phone, and/or the phone may render some actions or features or applications unavailable to the phone user in whole or in part. For example, once the phone determines that the phone user is driving a moving vehicle, the phone: (a) may block the operation of a messaging application or module, a texting application or module, a typing application or module, a mapping application or module, a navigation application or module, an email application or module, a video conference application or module; and/or (b) may turn-off or deactivate one or more features of an application, for example, turning-off the "send" function of a texting application, or turning-off the option to compose a new message (e.g., while keeping operational the features of reading incoming messages); and/or (c) may turn-on or activate one or more features of an application, for example, turning-on a voice-recognition input method, optionally while deactivating a keyboard-dependent input method or a typing or swiping input method; and/or (d) may present or convey to the user a graphical and/or textual and/or voice warning or notification, indicating to the user that the phone is aware of the fact that the phone user is driving a moving vehicle, optionally indicating to the user that this feature is illegal and/or unsafe, and optionally warning the user that the currently-used function or application will no longer be available to the user (e.g., immediately, or within a pre-defined time period, or upon next attempt to use it) at all or until the vehicle is not moving (at all, or for at least 50 consecutive seconds); and/or (e) may force the phone user to perform one or more actions (e.g., exit a messaging application) in order to re-allow one or more applications or features of the phone; and/or (f) may create, modify and/or edit a logbook which keeps track of instances in which the phone deduced that the phone user was driving a moving vehicle while texting or emailing or typing on a phone (e.g., a logbook which keeps a time/date stamp for each such instance, indicating a start time and/or end time and/or other time points within such usage; optionally indicating the cumulative time per instance of such texting while driving; optionally indicating the particular application used by the phone user by driving; optionally indicating the identity of the party with whom the phone user communicated via texting while driving); and/or (g) may send a copy of that logbook, or may send an alarm or alert or notification, via texting or via email, to one or more pre-designated recipients (e.g., a parent or guardian or caregiver of the phone user; a manager or boss or supervisor or employer of the phone user; a law enforcement entity, e.g., a police department or a traffic police unit), optionally sending also to such recipient(s) an image of the phone user (e.g., captured by the front-facing camera of the phone); and/or (h) may allow the user to override the blocking of one or more phone features or phone applications, for example, by asking the user to confirm or re-confirm (e.g., by asking the user, while the user is texting a message, "It seems that you are driving and texting; are you sure that you would like to continue texting although it is unsafe and illegal?", and allowing the user to respond with "Yes" via a voice command and/or by selecting a "yes" button), or by asking the user to type in or to utter a pre-defined overriding password or Personal Identification Number (PIN) or passphrase, or the like.

In some embodiments, the phone may deduce that the phone user is sitting in a driver seat of a moving vehicle (e.g., based on one or more parameters which may not necessarily include image analysis of a front-side camera image which may show a vehicular seat-belt); and the phone may deduce, based on a front-side camera image which shows the user without a seatbelt, that the user is not wearing a seatbelt. In some embodiments, in response to such determinations, the phone may present or convey to the phone user a message or notification or warning or question, using text and/or graphics and/or spoken text (e.g., pre-recorded message, or text-to-speech converted message), along the line of "Warning, I think that you are driving a car but your seatbelt is not buckled", or, "Hey, not only are you driving and texting, you are not even buckled-up with your seatbelt!".

In some embodiments, the phone may have two (or more) types of access control mechanisms. A phone owner or a primate user (e.g., an employer or a parent) may have full access or non-restricted access, which may allow the phone owner to configure the phone such that the phone will monitor and automatically detect that a user of the phone is operating a vehicle while texting; and the phone owner may further define the particular features that are to be denied or allowed upon such detection (e.g., sending out of text messages; composing of a text message; composing of an email), the particular conditions for blocking or allowing certain features, the ability of a secondary user to override and unblock the features by confirming or by providing a password, or the like. In some embodiments, a non-owner user, or a secondary user (e.g., a minor, a teenager, an employee), may have partial access or restricted access, which may allow such user to utilize the phone subject to the limitations or conditions set forth by the primary user, and which the secondary user may not be able to modify and/or override. The phone may enforce on the secondary user, the limitations placed by the primary user. Optionally, the phone may send a notification to a recipient designated by the primary user, by using a delivery means designated by the primary user (e.g., email, text message, voice message), indicating that the secondary user of the phone performed certain operations (e.g., concurrently driving and texting).

In some embodiments, the phone may create, maintain, update and/or modify a log or logbook or list or database, which keeps tracks of occurrences of concurrent driving and texting. Optionally, notification about such occurrence(s), may be sent by the phone automatically to a pre-designated recipient (e.g., pre-designated by the primary user of the phone, and non-modifiable by the secondary user of the phone). Optionally, in some embodiments, a copy of the logbook, or a copy of a portion of the logbook (e.g., daily portion, weekly portion, monthly portion) may be sent by the phone to a pre-designated recipient (e.g., parent or employer of the phone user).

In some embodiments, the phone may autonomously initiate a process which entails negative monetary (or other) consequences to the phone user which the phone determines to be concurrently texting and driving. For example, a traffic police system or a court system may be automatically notified by the phone of such occurrence, and a monetary fine (or other sanction or penalty or punishment) may be automatically imposed on the phone user. Optionally, a cellular service provider or cellular network provider or cellular phone provider may be notified of such occurrence, and a monetary debit may be imposed on the cellular bill or cellular account of the phone user.

In some embodiments, the phone may autonomously initiate a process which entails positive monetary (or other) consequences (e.g., a payment, a reward, a prize, a credit, a statement credit) to the phone user which the phone determines as refraining from concurrently texting and driving (e.g., for a pre-defined time period, for example, for at least one hour, for at least one day, for at least three days, for at least a week, for at least a month, or the like). For example, the phone may determine that within a pre-defined time period, the phone has never deduced that the phone user has been concurrently driving and texting; and the phone may notify one or more recipients about such good and lawful behavior of the phone user. Such recipients may include, for example, a traffic police department, a court system, a cellular service provider, a parent or guardian, an employer, or the like. In some embodiments, the phone may automatically initiate a process in which an employer of the phone user pays a monetary prize (or provides another prize) to the phone user for refraining from concurrent driving-and-texting for such period of time. In some embodiments, the phone may automatically initiate a process in which a cellular provider the phone user pays to the user a monetary credit amount (e.g., a nominal or symbolic amount, or a significant amount), for refraining from concurrent driving-and-texting for such period of time; optionally, the monetary credit amount may be symbolic (e.g., a one-dollar credit prize for refraining from concurrent texting-and-driving for a period of seven consecutive days), and may optionally be accompanied with a congratulating message or other type of positive acknowledgement.

In some embodiments, some or all of the analysis operations and/or determinations and/or deducing operation described herein, or their processes or methods, may be performed exclusively within the phone and/or by the phone and/or internally by the phone, and may not involve or require any external processing by a unit or module external to the phone. In some embodiments, some or all of the analysis operations and/or determinations and/or deducing operation described herein, or their processes or methods, may be performed exclusively externally to the phone and/or by a remote server and/or by a cloud computing service and/or by a cellular base station and/or by other type of external or remote unit or device. In some embodiments, for example, images and/or audio and/or video and/or text messages and/or audio conversations, may be captured locally by the phone (e.g., using a front-side camera and/or a back-side camera and/or a microphone); may be processed locally by a processor within the phone, and/or, may be transmitted wirelessly to a remote server or remote processor for analysis or for additional analysis; and the remote server may send back wirelessly to the phone the results of the remote analysis. In some embodiments, both local and remote analysis may be used in combination. In some embodiments, a local analysis within the phone may be initially performed in order to determine whether a current usage scenario is a good candidate for determining a concurrent driving-and-texting; and if the local analysis results in the positive, such that indeed a good candidate is locally detected, than the captured data (or other data, or additional data, or newly-captured data) may be sent wirelessly by the phone for further processing at a remote server, for reassurance purposes or for performing the final determination. In some embodiments, substantially all the processing and determination of concurrent driving-and-texting may be performed remotely, externally to the phone, by a remote server; and the local phone may receive an incoming wireless signal indicating such concurrent driving-and-texting.

Some embodiments may be adjusted, modified and/or configured to operate particularly at night-time or in dark environments. For example, some embodiments may utilize a flash or other phone-based illumination, in order to capture photographs in the dark and then use such photographs for image analysis. Some embodiments may utilize, or may take into account, the luminosity or illumination or glow or ambient light that a vehicular dashboard produces at night-time or when it is dark; may utilize such dashboard illumination for image capturing purposes; and/or may utilize the fact that dashboard illumination is present in order to contribute to (or lead to) a determination that the phone user is seated in a vehicular driver seat. For example, in some embodiments, the phone may determine that the current local time is 9:45 PM (e.g., based on an internal clock of the phone, and/or based on a signal or other data received by the phone from a cellular service provider); may determine that most probably the environment is dark; may determine that the phone is moving at a speed of 48 kilometers per hour (e.g., based on GPS data or other location data); may deduce that, therefore, the phone user is located within a moving car; may assume that generally or typically a vehicular cabin is dark at night time when travelling at such velocity; may detect that the particular phone appears to be illuminated by a glow or illumination from the vehicular dashboard (e.g., based on light measurement or light detection, by a light meter or light sensor of the phone or of its camera(s) or other suitable component); and may thus determine that since the phone is not in the dark, that the phone is being held by a driver in a driver seat in proximity to the illuminated dashboard, and not by a passenger. Other suitable mechanisms may be used for dark or reduced-illuminations scenarios or environments or areas.

In some embodiments, the phone may operate as described herein without specific knowledge or awareness of the phone user to the fact that the phone may secretly or covertly be monitoring the user's operations, or may be secretly capturing audio and/or images or monitoring messages, speed of movement, location, or other parameters or functions. For example, a corporate supervisor may provide the phone to a driver of the corporation, with or without notifying such driver that the phone may be able to (secretly) perform one or more of the operations described herein.

Reference is made to FIG. 1A, which is a schematic block diagram illustration of a phone 100, in accordance with some demonstrative embodiments. Phone 100 may include, for example, some or all of the following components: a processor 101 (e.g., a general purpose processor, a specific processor, a controller, a Central Processing Unit (CPU), circuitry, an Integrated Circuit (IC), a logic component, a single-core or multiple-core processor, or the like); a memory unit 102 (e.g., phone memory; Secure Digital (SD) card; SIM card; Flash memory; volatile memory; non-volatile memory; RAM; or the like); a storage unit 103 (e.g., a Flash storage unit, a miniature hard disk, a SIM card, non-volatile storage); a wireless transceiver 104 (e.g., wireless transmitter and/or wireless receiver, a cellular transceiver, a 2G transceiver, a 3G transceiver, a 4G transceiver, a 4G LTE transceiver, a Wi-Fi transceiver, a Wi-Max transceiver, a 3GPP transceiver, an IEEE 802.11 transceiver, an IEEE 802.16 transceiver, or the like); an antenna 105 (e.g., an internal antenna, an external antenna, an internal/external antenna, an omni-directional antenna, a monopole antenna, a dipole antenna, an end fed antenna, a circularly polarized antenna, a micro-strip antenna, a diversity antenna, or the like); a display unit 106, (e.g., a screen, a touch-screen, a multi-touch screen, a screen able to present text and/or graphics and/or images and/or photographs); an input unit 107, (e.g., a physical keyboard, a physical keypad, an on-screen keyboard, an on-screen keypad, a mini joystick, a touch-pad, a touch-screen, a multi-touch screen, a tactile interface, or the like); a microphone 108 able to receive and/or sense and/or capture audio signals spoken or uttered by a user of phone 100; one or more speaker (s) 109 able to produce audio and/or sound; a power source 110 (e.g., a battery, a rechargeable battery, a replaceable battery, or the like); a graphic processor 111, (e.g., a Graphic Processing Unit (GPU), a graphics accelerator, or the like); an Operating System (OS) 112 (e.g., Apple iOS, Android, a Microsoft OS or a Windows OS, Symbian, a Linux or Unix OS, a Blackberry OS, or the like); a USB port 113 (or mini-USB port or micro-USB port); an audio socket 114 for connecting earphones or headphones and/or for providing audio output therethrough; an HDMI port 115 (or, mini-HDMI port or micro-HDMI port); one or more applications 116; a front-side or front-facing camera 117, able to capture or acquire images and/or photographs and/or video, in High Definition (HD, 1080p, 720p) or other resolution or quality (e.g., VGA); a back-side or back-facing camera 118, able to capture or acquire images and/or photographs and/or video, in High Definition (HD, 1080p, 720p) or other resolution or quality (e.g., VGA); one or more light sensor(s) 119 or light meters or light measuring components, which may be independent from other components of phone 100, or may be associated with or integrated with front-facing camera 117, or may be associated with or integrated with back-facing camera 118; one or more illumination unit(s) 120 or light-producing unit (s) or "flash" illumination components, which may be independent from other components of phone 100, or may be associated with or integrated with front-facing camera 117, or may be associated with or integrated with back-facing camera 118; and/or other suitable components (e.g., a front-side camera, a back-side camera, one or more physical buttons, or the like); a Global Positioning System (GPS) receiver 121 or other location-determining or location-estimating component able to determine location or geographical or geo-spatial location (e.g., based on having a line-of-sight with multiple GPS satellites, or by using other location-estimating or location-determining methods); one or more accelerometer(s)

122 (or motion sensors, or other suitable components) able to determine and/or detect and/or measure and/or estimate, for example, acceleration or deceleration or change-of-velocity of proper acceleration or four-acceleration, optionally in conjunction with an Inertial Navigation System (INS), or in conjunction with a system or sub-system able to substantially continuously calculate (e.g., via dead reckoning or deduced reckoning or DR) the position and/or orientation and/or velocity (e.g., direction and speed of movement) of phone 100 without the need for an external reference or without relying on any object or satellite or item external to phone 100; and/or other suitable modules or components. In some embodiments, components and/or modules of phone 100 may be enclosed in, or may be held in, a housing or enclosure or container.

In some embodiments, phone 100 may include one or more modules, logical units, applications, or components, which may be implemented by using software and/or hardware, and which are shown in FIG. 1A as analyzer 130.

Figure 1B:
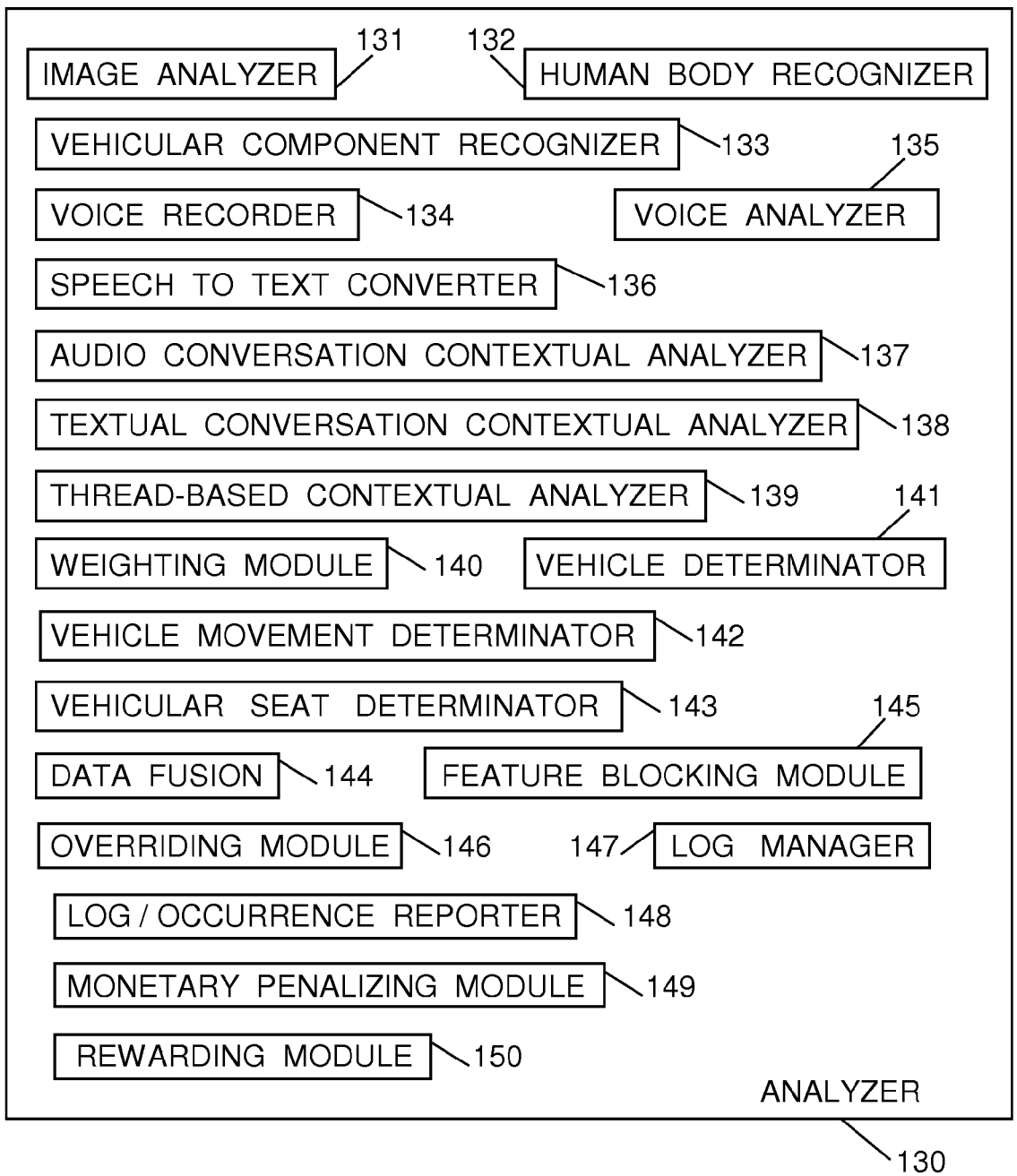
FIG. 1B is a schematic block diagram illustration of an analyzer module, in accordance with some demonstrative embodiments.

Reference is made to FIG. 1B, which is a schematic block diagram illustration of analyzer 130, in accordance with some demonstrative embodiments. Analyzer 130 may include one or more modules, logical units, applications, or components, which may be implemented by using software and/or hardware, such as, for example: an image analyzer 131 able to process and/or analyze one or more images acquired by phone 100; a human body recognizer 132 able to process images and recognize a human face or human body or human body part(s) (e.g., head, shoulder, shoulders, neck, or the like); a vehicular component recognizer 133 able to process images and recognize the existence and/or type and/or characteristics of one or more vehicular components (e.g., steering wheel, speedometer, vehicular music player, vehicular air conditioning unit or outlet or control unit, vehicular windows or wind-shield, vehicular control buttons, vehicular meters or gauges, vehicular window-control buttons, dashboard components, cabin components, seatbelts, or the like); a voice recorder 134 able to capture audio, voice, speech, utterances, noise, ambient sound, background conversation, cellular conversation, and/or other types of audio; a voice analyzer 135 able to process the acquired audio, able to characterize and/or analyze acquired audio, able to distinguish among two or more parties in a captured conversation, able to identify or distinguish a local talker from a remote talker, able to identify or distinguish a cellular conversation from a non-cellular (e.g., ambient or face-to-face or side-by-side) conversation, able to identify or distinguish speaker gender (male or female) and/or age group (e.g., child, teenager, adult); a speech to text converter 136 able to recognize text uttered in captured audio; an audio conversation contextual analyzer 137 able to perform contextual analysis on text obtained from speech that was recorded or captured; a textual conversation contextual analyzer 138 able to perform contextual analysis on text obtained or extracted from text messages, SMS messages, email messages, or the like; a thread-based contextual analyzer 139 able to generate contextual insights and determinations by analyzing a batch or thread or set of two or more (consecutive or non-consecutive) messages or text messages or email messages (e.g., a set of two messages including "Are you driving to me now?" and a response of "Yeah"); a weighting module 140 able to attribute weight or relative weight or score to various criterions or to interim analysis results, and optionally able to add weights or scores (including positive and/or negative weights and scores), and optionally able to compare and/or check whether an aggregate or cumulative weight or score is greater than (or smaller than, or equal to) a threshold value; a vehicle determinator 141 able to determine or to estimate, based on one or more information items or interim analysis results, whether or not phone 100 is located within a vehicle; a vehicle movement determinator 142 able to determine or to estimate, based on one or more information items or interim analysis results whether or not phone 100 is located within a moving vehicle, or whether or not phone 100 is moving, or whether or not phone 100 is stationary or non-moving, or whether or not phone 100 is moving at a vehicular velocity (e.g., a velocity which is typical of vehicles and is not typical of pedestrians, or is impossible for pedestrians), or whether or not phone 100 is moving at a pedestrian velocity or at a velocity which does not necessarily indicate that phone 100 is within a vehicle; a vehicular seat determinator 143 able to determine or to estimate, based on one or more information items or interim analysis results, whether or not phone 100 is being held by (or operated by, or associated with) a user who is seated in a vehicular driver seat, or in a non-driver vehicular seat, or in a vehicular passenger seat, or in a vehicular back-row seat; a data fusion module 144 able to gather, process and/or take into account multiple indications, interim results, candidate resolutions, or other parameters, and able to reach a determination on whether or not phone 100 is held or operated by a user seated in a driver seat of a moving vehicle (e.g., able to determine "positive", or "negative", or "insufficient data to determine in certain", or "contradicting data does not allow a certain determination"); a feature blocking module 145 able to block, disallow, deactivate, fade-out, or render non-operational or partially-operational one or more features, functions, functionalities and/or applications of phone 100; an overriding module 146 able to execute or perform a mechanism or method which allows the phone user to override blocking of feature(s), for example, by providing a positive response to a confirmation question, or by correctly providing a pre-designated password or PIN; a log manager 147 able to create, modify, edit and/or update a log or record or database of one or more types of occurrences (e.g., a determined texting-and-driving occurrence; a determined emailing-and-driving occurrence; or the like), optionally logging the time and date of each occurrence, the time length of each occurrence, the GPS data or location data or geo-spatial data associated with each occurrence, the remote party for each occurrence (e.g., the remote recipient of the text message of a driving-and-texting occurrence); a log/occurrence reporter 148 able to notify a party external to phone 100 (e.g., a parent, a supervisor, an employer, a corporate fleet manager, a law enforcement unit) about an occurrence and/or able to initiate transfer or transmittal of the log (or portions thereof, or entries therefrom) to such remote party; a monetary penalizing module 149 able to initiate a process which entails a negative monetary consequence to the user of phone 100 (e.g., due to concurrent texting-and-driving); a rewarding module 149 able to initiate a process which entails a reward or positive monetary consequence to the user of phone 100 (e.g., due to refraining from concurrent texting-and-driving for a predefined time period); and/or other suitable components or modules.

Figure 2A:
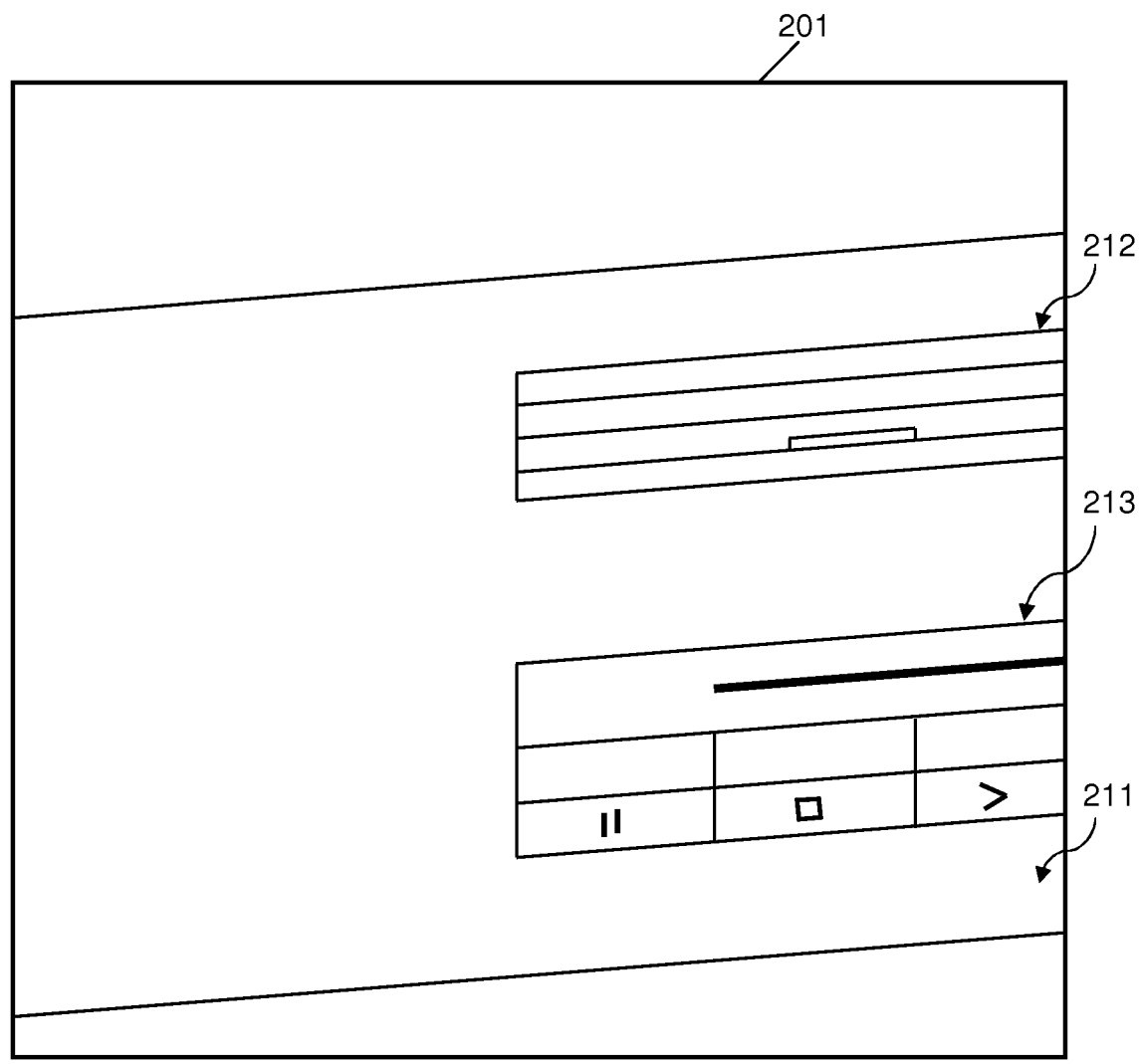
FIG. 2A is a schematic illustration of an image acquired by a back-side camera of a phone, by a user seated in a vehicular driver seat, in accordance with some demonstrative embodiments.

Reference is made to FIG. 2A, which is a schematic illustration of an image 201 acquired by a back-side camera of a phone, by a user seated in a vehicular driver seat, in accordance with some demonstrative embodiments. Image 201 shows a portion of a vehicular dashboard 211 (or vehicular front panel, or vehicular interior), which is slanted diagonally, going from bottom-left to upper-right. This particular type and/or direction of slanting, occurs particularly in images captured by a back-side camera of a phone held by a user seated in a vehicular driver seat (e.g., a front left seat in the car, in North America); and does not occur in images taken from a passenger seat (e.g., a front-row passenger seat, or a back-row passenger seat).

Furthermore, a left-side portion of a vehicular air conditioning outlet 212 is visible in image 201; whereas a right-side portion of vehicular air conditioning outlet 212 is not visible in image 201. This phenomena characterizes some images captured by a back-side camera of a phone held by a user seated in a vehicular driver seat (e.g., a front left seat in the car, in North America); and it does not occur in images taken from a passenger seat (e.g., a front-row passenger seat, or a back-row passenger seat).

Additionally, a left-side portion of a vehicular music player 213 is visible in image 201; whereas a right-side portion of vehicular music player 213 is not visible in image 201. This phenomena characterizes some images captured by a back-side camera of a phone held by a user seated in a vehicular driver seat (e.g., a front left seat in the car, in North America); and it does not occur in images taken from a passenger seat (e.g., a front-row passenger seat, or a back-row passenger seat).

Furthermore, the left-side portion of vehicular air conditioning outlet 212, and/or the left-side portion of vehicular music player 213, may appear diagonally slanted in image 201. This phenomena characterizes some images captured by a back-side camera of a phone held by a user seated in a vehicular driver seat (e.g., a front left seat in the car, in North America); and it does not occur in images taken from a passenger seat (e.g., a front-row passenger seat, or a back-row passenger seat).

Figure 2B:
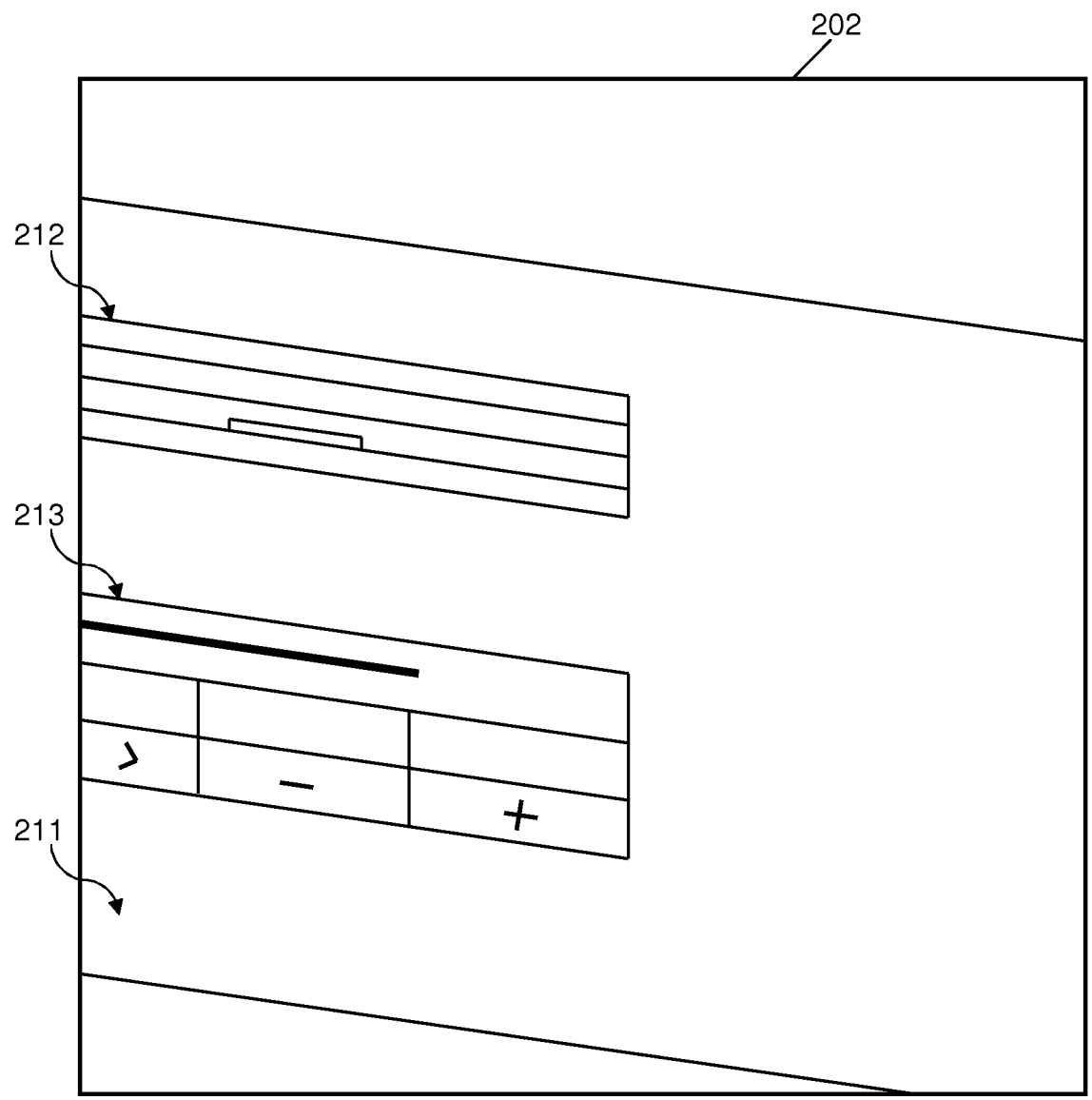
FIG. 2B is a schematic illustration of an image acquired by a back-side camera of a phone, by a user seated in a vehicular front-row passenger seat, in accordance with some demonstrative embodiments.

Reference is made to FIG. 2B, which is a schematic illustration of an image 202 acquired by a back-side camera of a phone, by a user seated in a vehicular front-row passenger seat, in accordance with some demonstrative embodiments. Image 202 shows a portion of the vehicular dashboard 211 (or vehicular front panel), which is slanted diagonally, going from bottom-right to upper-left. This particular type and/or direction of slanting, occurs particularly in images captured by a back-side camera of a phone held by a user seated in a vehicular front-row passenger seat (e.g., a front right seat in the car, in North America); and do not occur in images taken from a driver seat (e.g., a front-row left-side seat, in North America).

Furthermore, a right-side portion of vehicular air conditioning outlet 212 is visible in image 202; whereas a left-side portion of vehicular air conditioning outlet 212 is not visible in image 202. This phenomena characterizes some images captured by a back-side camera of a phone held by a user seated in a vehicular front-row passenger seat (e.g., a front right seat in the car, in North America); and it does not occur in images taken from a driver seat (e.g., a front-row left seat).

Furthermore, a right-side portion of vehicular music player 213 is visible in image 202; whereas a left-side portion of vehicular music player 213 is not visible in image 202. This phenomena characterizes some images captured by a back-side camera of a phone held by a user seated in a vehicular front-row passenger seat (e.g., a front right seat in the car, in North America); and it does not occur in images taken from a driver seat (e.g., a front-row left seat).

Additionally, the right-side portion of vehicular air conditioning outlet 212, and/or the right-side portion of vehicular music player 213, may appear diagonally slanted in image 202. This phenomena characterizes some images captured by a back-side camera of a phone held by a user seated in a vehicular front-row passenger seat (e.g., a front right seat in the car, in North America); and it does not occur in images taken from a driver seat (e.g., a front-row left seat).

Figure 3:
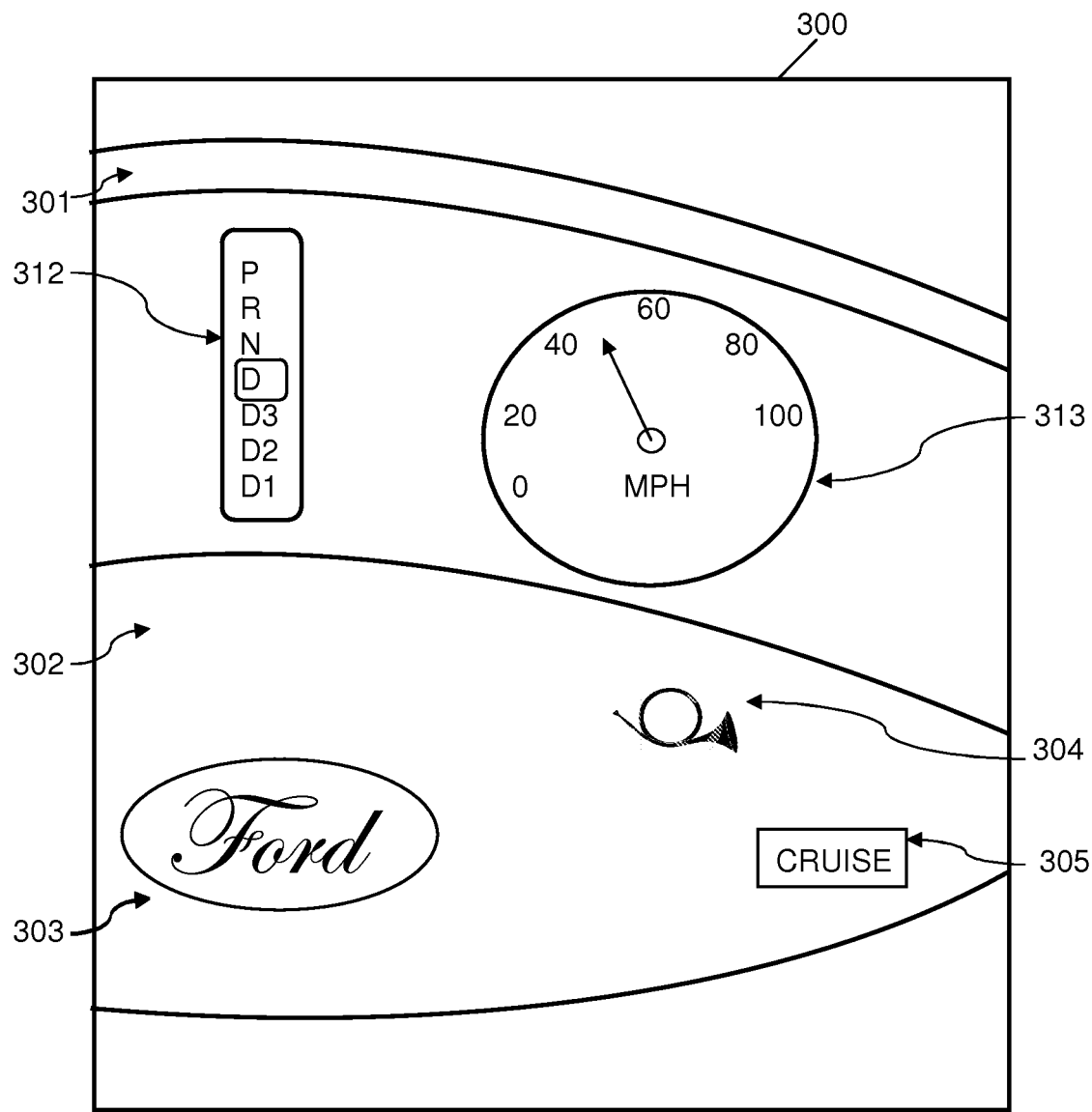
FIG. 3 is a schematic illustration of another image acquired by a back-side camera of a phone, by a user seated in a vehicular driver seat, in accordance with some demonstrative embodiments.

Reference is made to FIG. 3, which is a schematic illustration of an image 300 acquired by a back-side camera of a phone, by a user seated in a vehicular driver seat, in accordance with some demonstrative embodiments. Image 300 shows up-close portions of vehicular components that are typically visible mainly or exclusively (or, in their entirety) from the driver seat, and are shown in image 300 from a direct-facing point-of-view (e.g., the back-side camera of the phone is facing directly towards the steering wheel). For example, image 300 may include a portion of circumference 301 of the vehicular steering wheel; a portion of a center 302 of the vehicular steering wheel; a logo 303 of a vehicle manufacturer which typically appears on vehicular steering wheels (and does not appear, for example, on a passenger-side glove compartment); a graphical representation 304 (e.g., of a horn or a trumpet or a French horn or a honking device) indicative of the location of a vehicular horn; a cruise control button 305 (or set of buttons); a vehicular gear indicator 312 indicating which gear is being used (e.g., Parking, Neutral, Reverse, Drive); a vehicular speedometer 313 able to measure vehicular velocity; and/or other vehicular components or portions thereof (for example, a vehicular tachometer able to measure how fast a vehicular engine is running, for example, in Revolutions Per Minute (RPM); a vehicular gas meter (or other type of vehicular fuel gauge); a vehicular engine temperature meter; or the like). Detection and/or recognition of these vehicular components in image 300, particularly in combination of two or more components, and particularly if the components are shown clearly and appear to be in proximity to the back-side camera that captured image 300, may contribute or may lead to a determination that the phone is held by a user who is seated in a vehicular driver seat.

Figure 4:
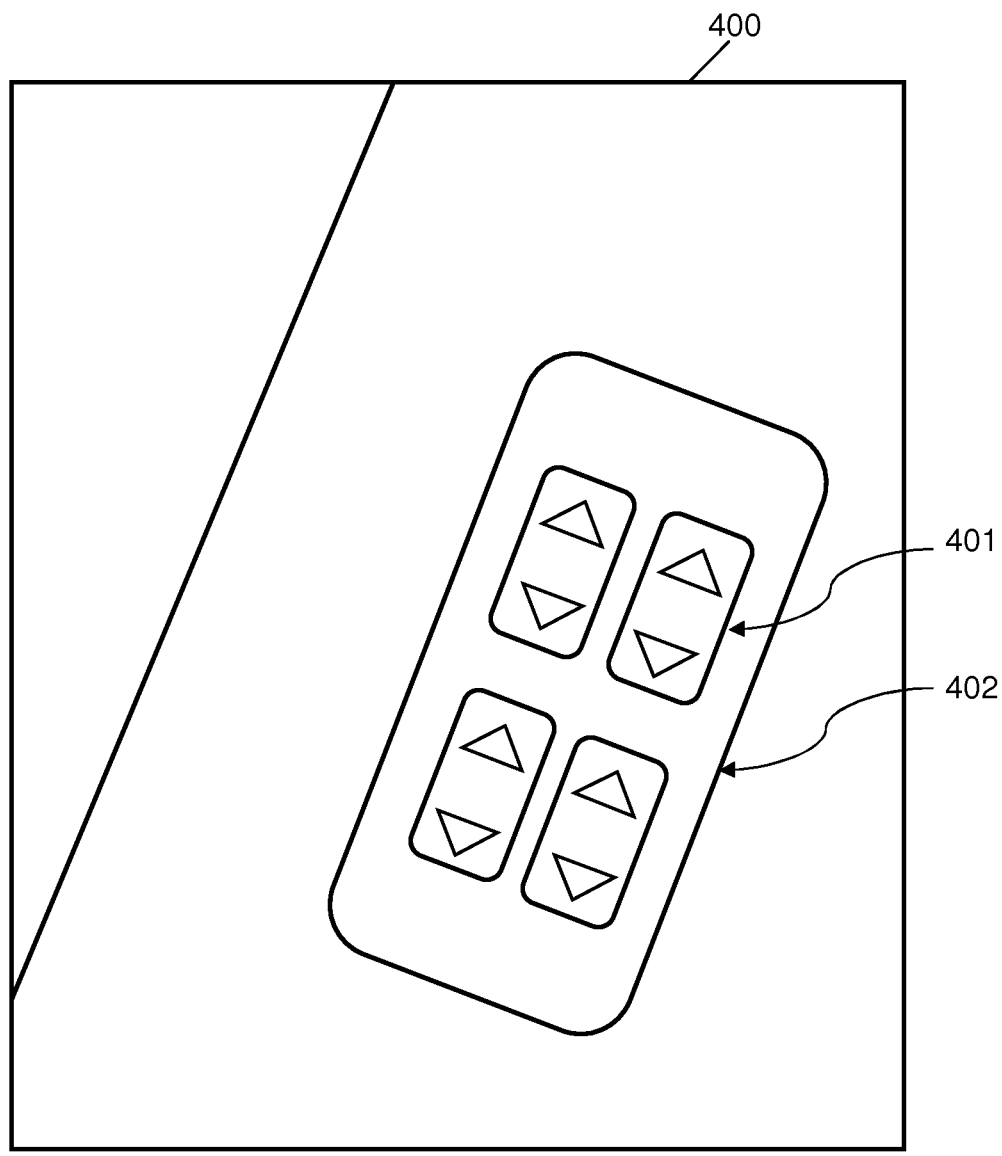
FIG. 4 is a schematic illustration of yet another image acquired by a back-side camera of a phone, by a user seated in a vehicular driver seat, in accordance with some demonstrative embodiments.
Figure 5A:
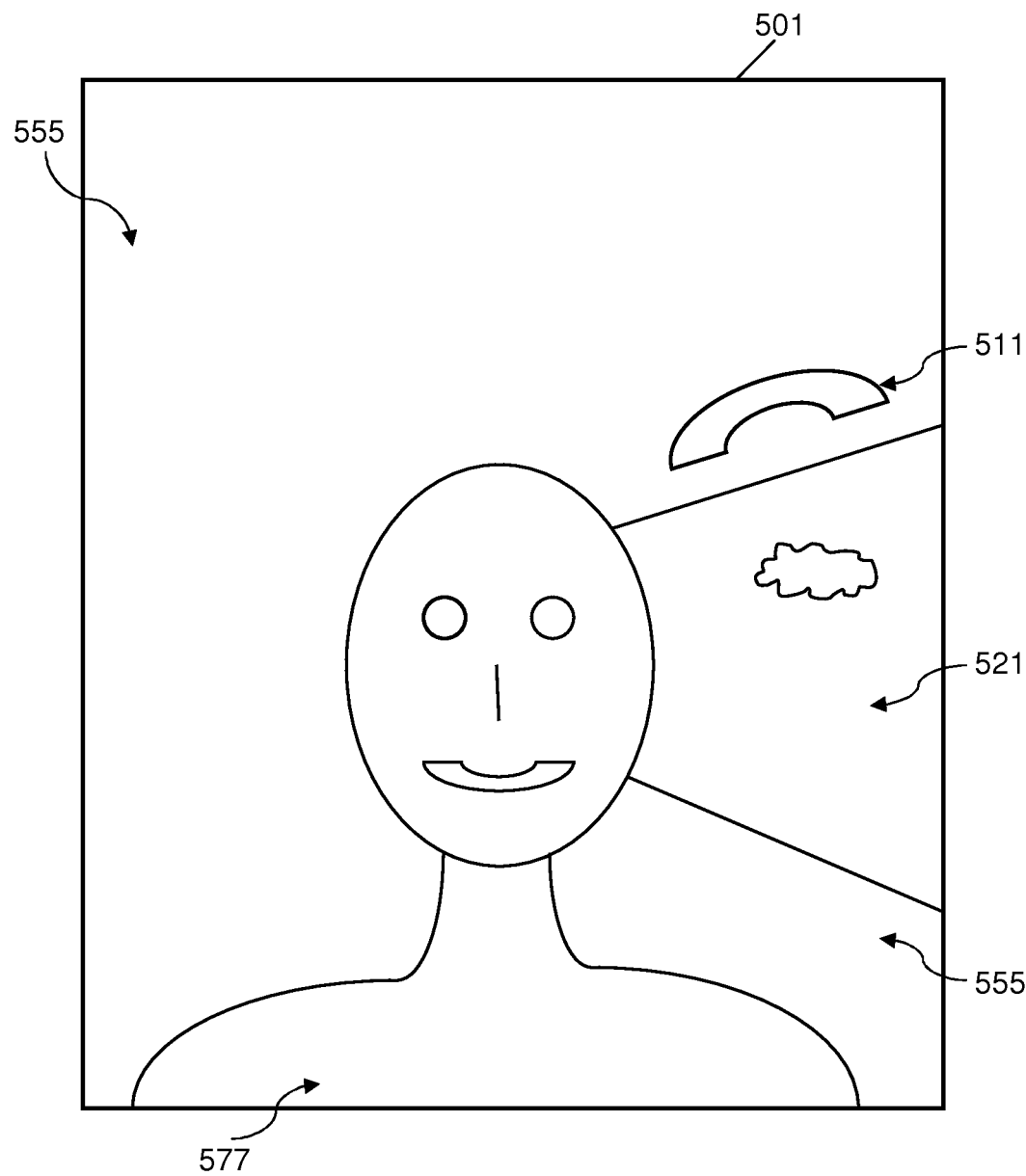
FIGS. 5A-5E are schematic illustrations of five images acquired by a front-side camera of a phone, by a user seated in five different seats in a vehicle, in accordance with some demonstrative embodiments.
Figure 5B:
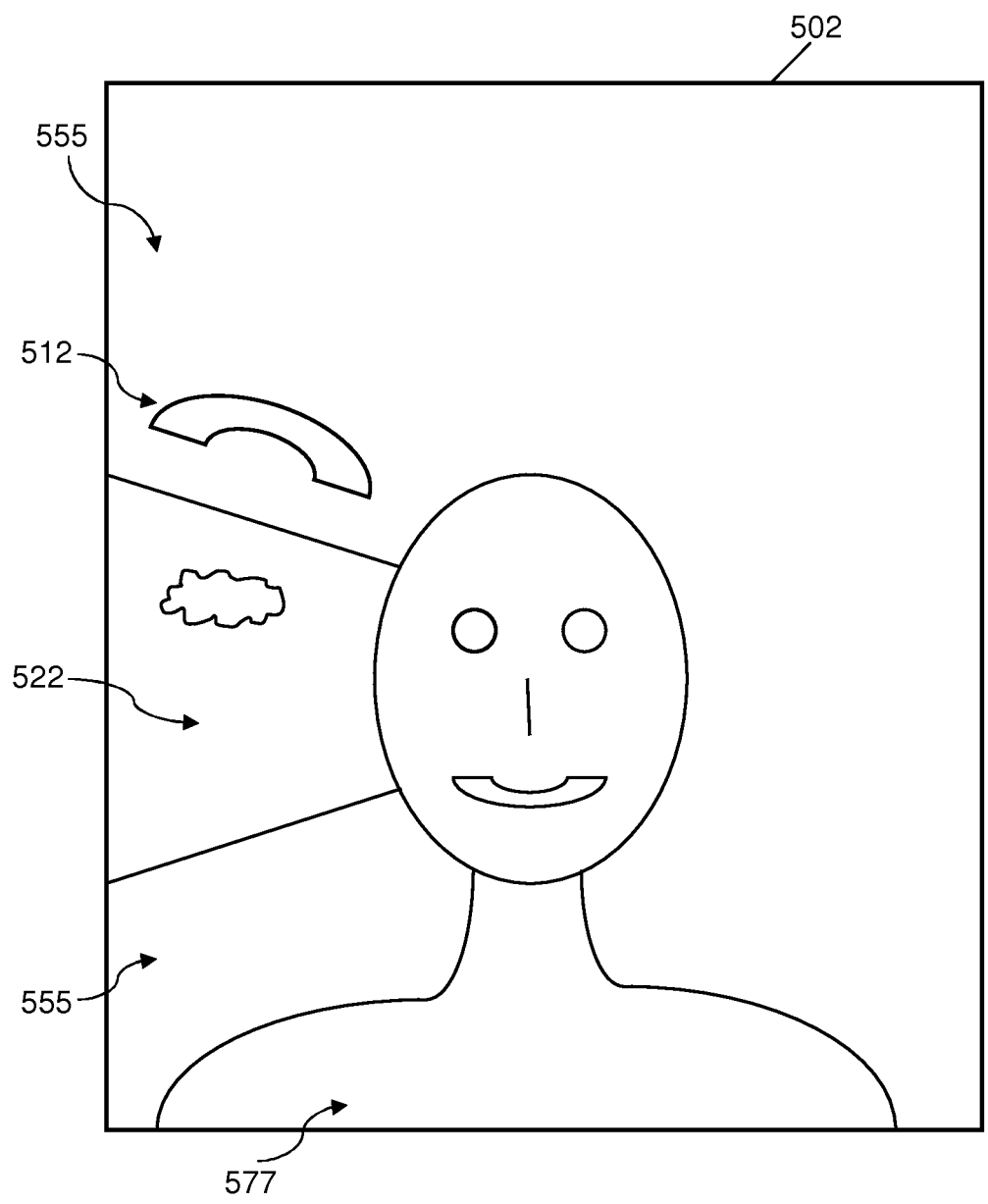
Figure 5C:
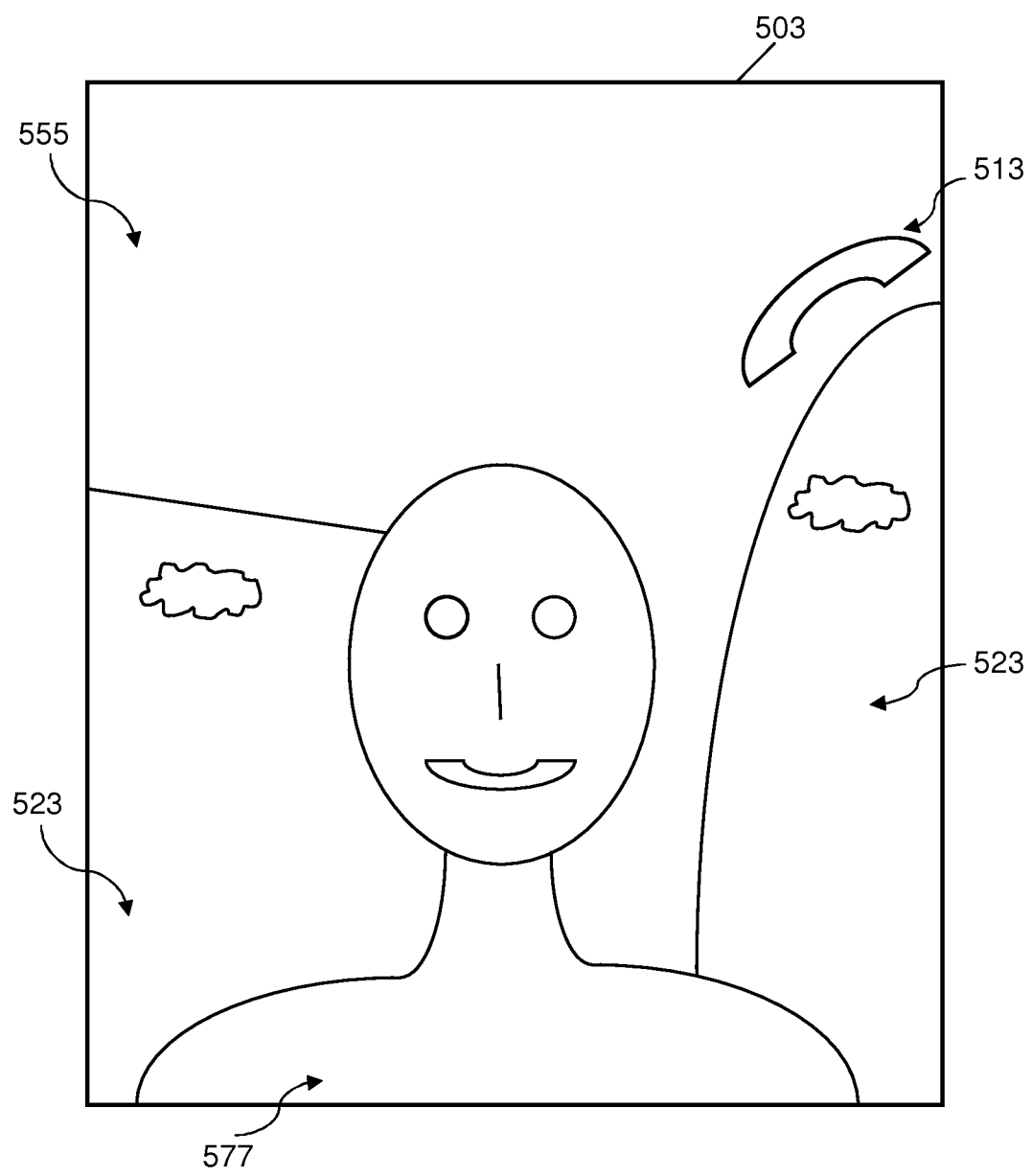
Figure 5D:
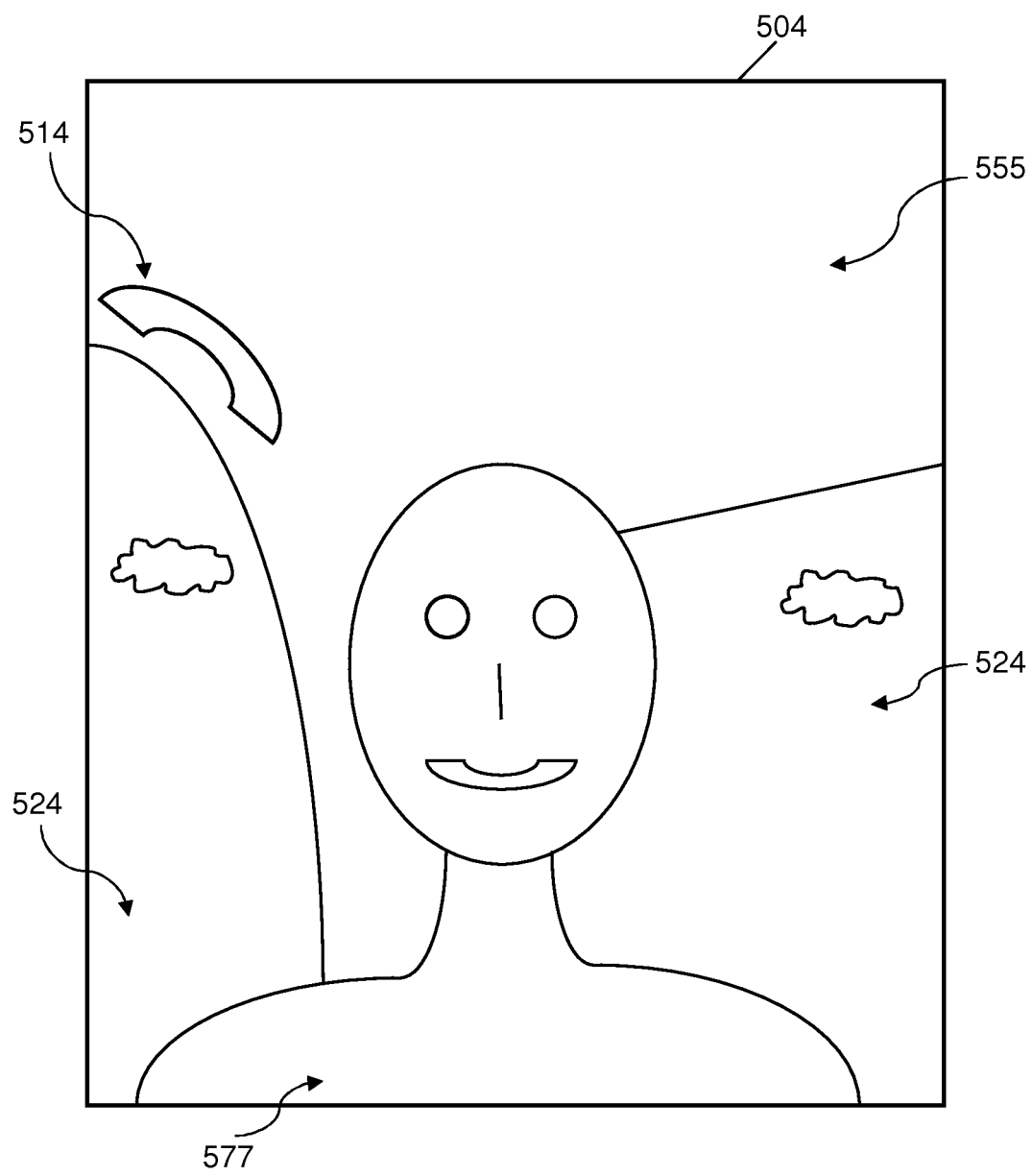
Figure 5E:
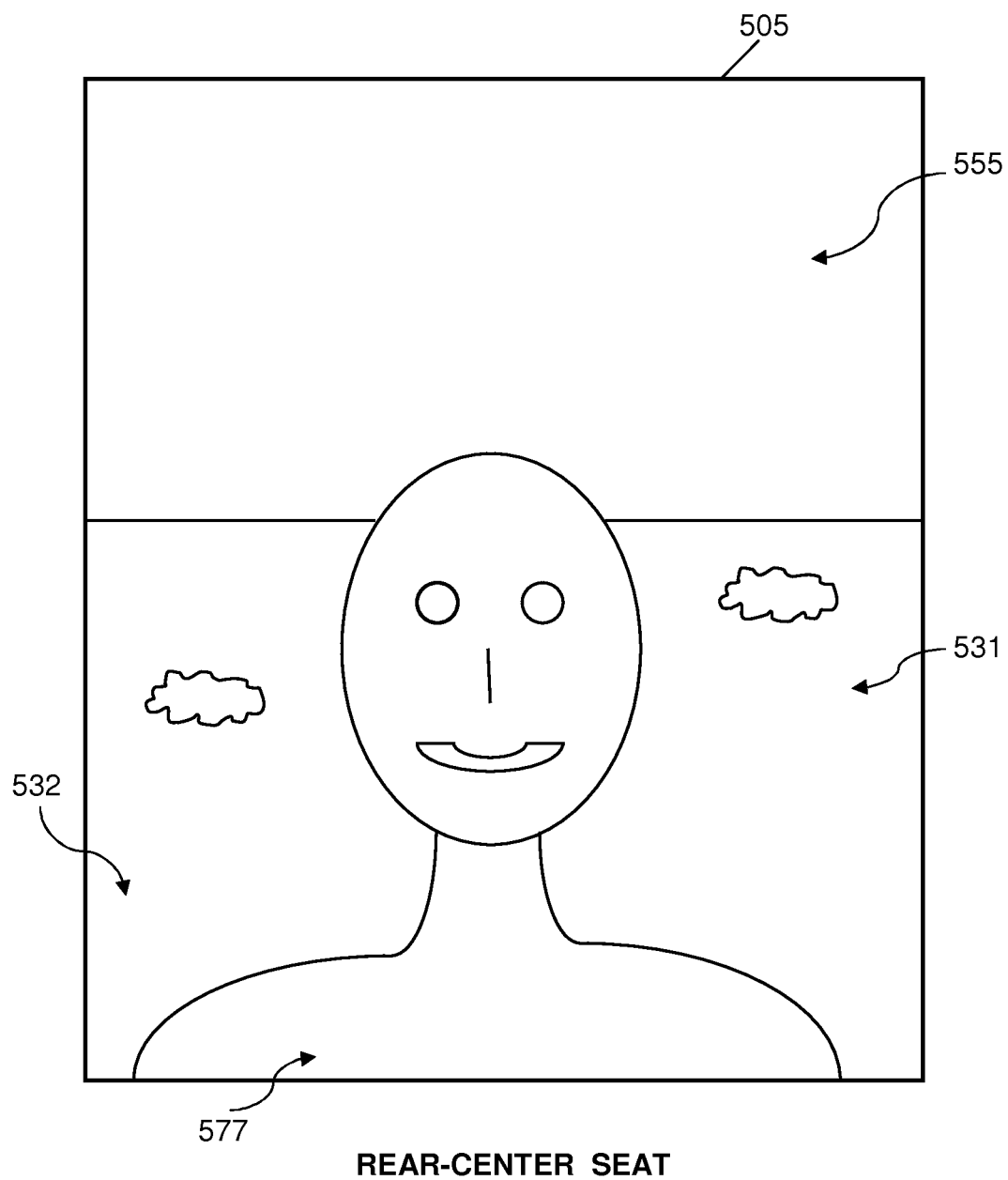

Reference is made to FIG. 4, which is a schematic illustration of an image 400 acquired by a back-side camera of a phone, by a user seated in a vehicular driver seat, in accordance with some demonstrative embodiments. Image 400 shows up-close portions of vehicular components that are typically visible mainly from the driver seat, and are shown in image 400 from an angular point-of-view. For example, image 400 may be captured by a back-side camera of a left-handed driver, who sits in the vehicular driver seat and holds the phone in her left hand. Image 400 may include, for example, four vehicular window control buttons 401, which may be arranged in an array 402 or matrix of two-by-two buttons (e.g., two lines, two rows).

In accordance with some embodiments, this unique arrangement of window control buttons 401, and this number of (four) window control buttons 401, is typically exclusive to the driver's side-door and is not to be found in a passenger door (which may include less than four window buttons; typically, only one window button). In some embodiments, for example, in a luxury or accessorized vehicle, the right-side front may rarely or may optionally include such arrangement of four window control buttons 401; however, the direction of the slanting of such buttons 401 and/or array 402 may be used by the phone in order to determine whether the user of the phone sits in the left-side or the right-side of the front row of the vehicle. For example, if the phone user sits in the front-left seat (the driver seat, in the United States), then the slanting of the generally-rectangular components shown in image 400 (and also, the slanting of the diagonal line shown in image 400) may run from bottom-left to upper-right, as depicted in image 400. In contrast, if the phone user sits in the front-right seat, then the slanting of the generally-rectangular components may run from bottom-right to upper-left.

Detection and/or recognition of these vehicular components in image 400, particularly the matrix or array 402 of four window-control buttons 401, and optionally with the particular direction of diagonal slanting depicted in image 400, all of them optionally appearing clearly and in proximity to the back-side camera that captured image 400, may contribute or may lead to a determination that the back-side camera of the phone is held by a user seated in a vehicular driver seat (front-left seat in North America).

Reference is made to FIGS. 5A-5E, which are schematic illustrations of five images 501-505 acquired by a front-side camera of a phone, by a user seated in five different seats in a vehicle, in accordance with some demonstrative embodiments.

Each one of images 501-505 may show a portion of a human body 577, for example, a head and/or neck and/or shoulders and/or chest and/or arms, or a combination of other body parts or body regions or portions thereof. Furthermore, each one of images 501-505 may show a portion of a vehicular interior area 555, which may typically be white of off-white or grey or brown or beige or light-colored, or may have other one or more colors.

Image 501 depicts a demonstrative photograph captured by a front-side camera of a phone held by a user seated in a front-left vehicular seat (e.g., the vehicular driver's seat in most cars in the United States). In image 501, the vehicular interior 555 appears above the human body 577 and also appears to the left of the human body 577; whereas a portion of the external environment or scenery 521 (which is external to the vehicle; and depicts a demonstrative cloud representing the sky or other extra-vehicular area or item or scenery) may be located to the right of the human body 577. The external environment or scenery 521 captured in image 501 may be, for example, generally trapezoid or generally triangular, or may have other suitable shape, which may depend on the location of the vehicular front left-side window which is on the left side of the vehicular driver's seat. Furthermore, a handle 511 may hang near (or at) the ceiling of the vehicle, above the frame of the left-side front door, and may appear in image 501 to be (in whole, or partially) on the upper-right side of image 501, or above and to the right of the human body 577; and handle 511 may appear to be non-slanted, or only slightly slanted (e.g., slanted by 5 or 10 or 15 or 20 or 25 degrees, relative to a horizontal base line of image 501 or relative to a shoulders line of human body 577, the slanting being from lower-left towards upper-right). These characteristics of image 501, by themselves, or in contradiction or being different from the characteristics of images 502, 503, 504 and/or 505, may be used in some embodiments in order to contribute to, or to lead to, a determination that image 501 was captured by the phone while the phone was held by a user seated in a front-left seat of the vehicle.

Image 502 depicts a demonstrative photograph captured by a front-side camera of a phone held by a user seated in a front-right vehicular seat (e.g., the vehicular front passenger seat in most cars in the United States). In image 502, the vehicular interior 555 appears above the human body 577 and also appears to the right of the human body 577; whereas a portion of the external environment or scenery 522 (which is external to the vehicle; and depicts a demonstrative cloud representing the sky or other extra-vehicular area or item or scenery) may be located to the left of the human body 577. The external environment or scenery 522 captured in image 502 may be, for example, generally trapezoid or generally triangular, or may have other suitable shape, which may depend on the location of the vehicular front right-side window which is on the right side of the vehicular front-row right-side (passenger) seat. Furthermore, a handle 512 may hang near (or at) the ceiling of the vehicle, above the frame of the right-side front (passenger) door, and may appear in image 502 to be (in whole, or partially) on the upper-left side of image 502, or above and to the left of the human body 577; and handle 512 may appear to be non-slanted, or only slightly slanted (e.g., slanted by 5 or 10 or 15 or 20 or 25 degrees, relative to a horizontal base line of image 501 or relative to a shoulders line of human body 577, the slanting being from lower-right to upper-left). These characteristics of image 502, by themselves, or in contradiction or being different from the characteristics of images 501, 503, 504 and/or 505, may be used in some embodiments in order to contribute to, or to lead to, a determination that image 502 was captured by the phone while the phone was held by a user seated in a non-driver seat, or seated in a front-right seat of the vehicle.

Image 503 depicts a demonstrative photograph captured by a front-side camera of a phone held by a user seated in a left-side back-row (rear) vehicular seat (e.g., the vehicular passenger seat located directly behind the driver in most cars in the United States). In image 503, the vehicular interior 555 appears mainly above the human body 577; and optionally, a thin portion or vertical portion of vehicular interior 555 may also appear to the right of human body 577; whereas one or more portions of the external environment or scenery 523 (which is external to the vehicle; and depicts a demonstrative cloud representing the sky or other extra-vehicular area or item or scenery) may be located, for example, to the right of the human body 577 (e.g., corresponding to scenery from the left-side back-row side-window) and/or to the left of the human body 577 (e.g., corresponding to scenery from the horizontally-elongated rear window of the vehicle). The external environment or scenery 523 captured in image 503 may be, for example, generally trapezoid or generally triangular on the left side of human body 577, and may be generally triangular (or may resemble a quarter of a circle, or a quarter of an oval) on the right side of human body 577, or may have other suitable shape(s), which may depend on the location of the vehicular window(s) relative to the passenger seating at the back-row left-side passenger seat. Furthermore, a handle 513 may hang near (or at) the ceiling of the vehicle, above the frame of the left-side back-row (passenger) door, and may appear in image 503 to be (in whole, or partially) on the upper-right side of image 503, or above and to the right of the human body 577; and handle 513 may appear to be slanted, or significantly slanted (e.g., slanted by more than 10 degrees, or more than 15 degrees, or more than 20 degrees, or more than 25 degrees, or more than 30 degrees, relative to a horizontal base line of image 503 or relative to a shoulders line of human body 577, the slanting being from lower-left towards upper-right). These characteristics of image 503, by themselves, or in contradiction or being different from the characteristics of images 501, 502, 504 and/or 505, may be used in some embodiments in order to contribute to, or to lead to, a determination that image 503 was captured by the phone while the phone was held by a user seated in a non-driver seat, or seated in a left-side back-row passenger seat of the vehicle.

Image 504 depicts a demonstrative photograph captured by a front-side camera of a phone held by a user seated in a right-side back-row vehicular seat (e.g., the vehicular passenger seat located furthest from driver in most cars in the United States). In image 504, the vehicular interior 555 appears mainly above the human body 577; and optionally, a thin portion or vertical portion of vehicular interior 555 may also appear to the left of human body 577; whereas one or more portions of the external environment or scenery 524 (which is external to the vehicle; and depicts a demonstrative cloud representing the sky or other extra-vehicular area or item or scenery) may be located, for example, to the left of the human body 577 (e.g., corresponding to scenery from the right-side back-row side-window) and/or to the left of the human body 577 (e.g., corresponding to scenery from the horizontally-elongated rear window of the vehicle). The external environment or scenery 524 captured in image 504 may be, for example, generally trapezoid or generally triangular on the right side of human body 577, and may be generally triangular (or may resemble a quarter of a circle, or a quarter of an oval) on the left side of human body 577, or may have other suitable shape, which may depend on the location of the vehicular window(s) relative to the passenger seating at the back-row right-side passenger seat. Furthermore, a handle 514 may hang near (or at) the ceiling of the vehicle, above the frame of the right-side back-row (passenger) door, and may appear in image 504 to be (in whole, or partially) on the upper-left side of image 504, or above and to the left of the human body 577; and handle 514 may appear to be slanted, or significantly slanted (e.g., slanted by more than 10 degrees, or more than 15 degrees, or more than 20 degrees, or more than 25 degrees, or more than 30 degrees, relative to a horizontal base line of image 504 or relative to a shoulders line of human body 577, the slanting being from lower-right towards upper-left). These characteristics of image 504, by themselves, or in contradiction or being different from the characteristics of images 501, 502, 503 and/or 505, may be used in some embodiments in order to contribute to, or to lead to, a determination that image 504 was captured by the phone while the phone was held by a user seated in a non-driver seat, or seated in a right-side back-row passenger seat of the vehicle Image 505 depicts a demonstrative photograph captured by a front-side camera of a phone held by a user seated in a center back-row vehicular seat (e.g., the vehicular passenger seat located in the back row, in the center thereof). In image 505, the vehicular interior 555 appears mainly above the human body 577; whereas two portions 531 and 532 of the external environment or scenery (which is external to the vehicle; and depicts demonstrative clouds representing the sky or other extra-vehicular area or item or scenery) may be located, for example, to the left and to the right of the human body 577 (e.g., corresponding to scenery from the rear window of the vehicle). Image 505 is further characterized by the absence of a handle (e.g., similar to handles 511-514), which typically is not associated with a central rear seat in a vehicle. These characteristics of image 505, by themselves, or in contradiction or being different from the characteristics of images 501, 502, 503 and/or 504, may be used in some embodiments in order to contribute to, or to lead to, a determination that image 505 was captured by the phone while the phone was held by a user seated in a non-driver seat, or seated in a center-rear passenger seat of the vehicle.

Other suitable images may be captured, analyzed and/or processed in accordance with embodiments of the present invention. In some embodiments, for example, a clear and/or enlarged and/or noticeable appearance of an elongated rear window of a vehicle, visible immediately behind a human body or a human face, in a photograph or image or video captured by the front-side camera of the phone, may lead or may contribute to a determination that the user of the phone seats in a non-driver seat or in a back row seat or in a back seat or in a passenger seat of the vehicle. Other suitable image characteristics may be used or may be taken into account.

Figure 6A:
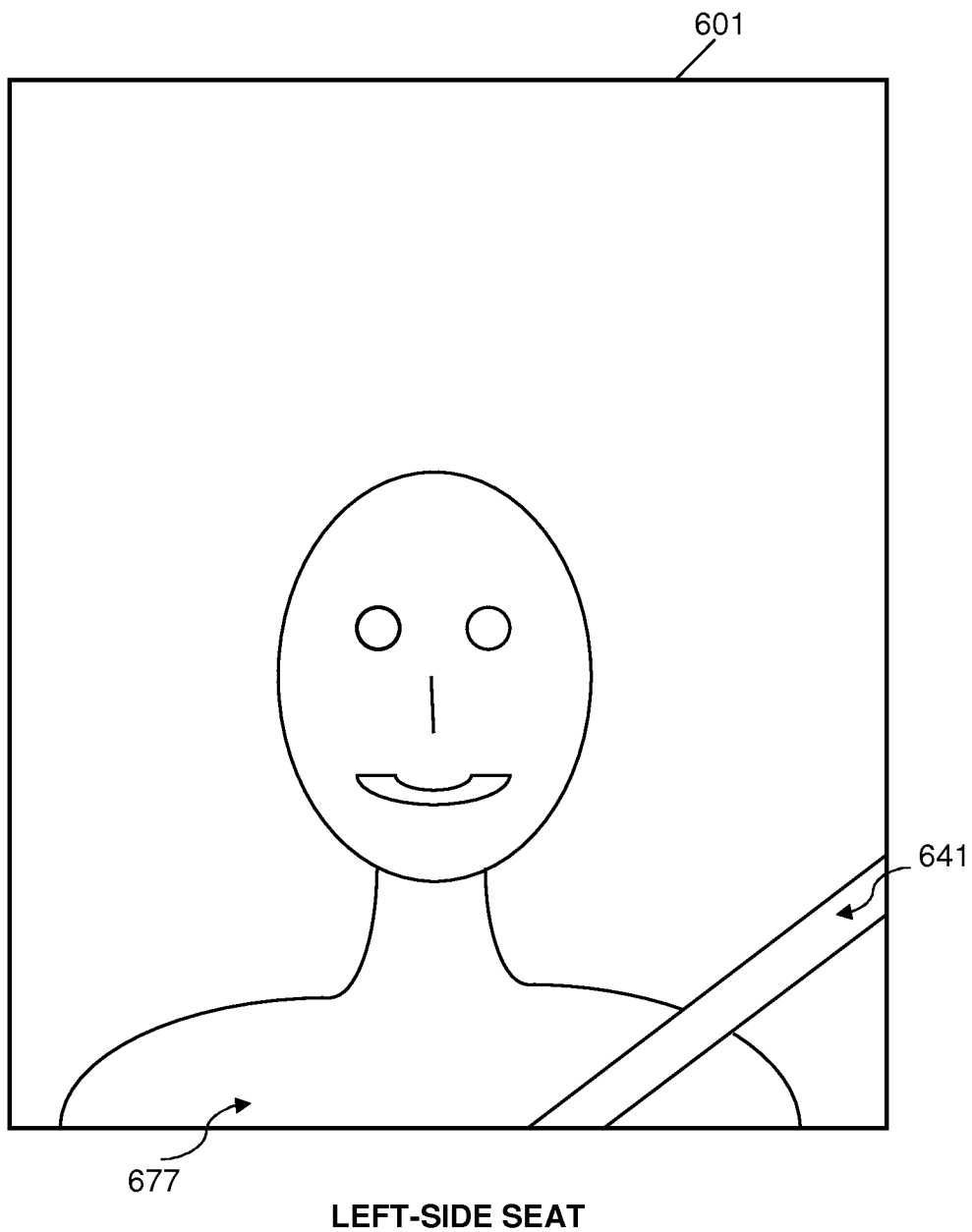
FIGS. 6A and 6B are schematic illustrations of two images and acquired by a front-side camera of a phone, by a user seated in two different seats in a vehicle, in accordance with some demonstrative embodiments.
Figure 6B:
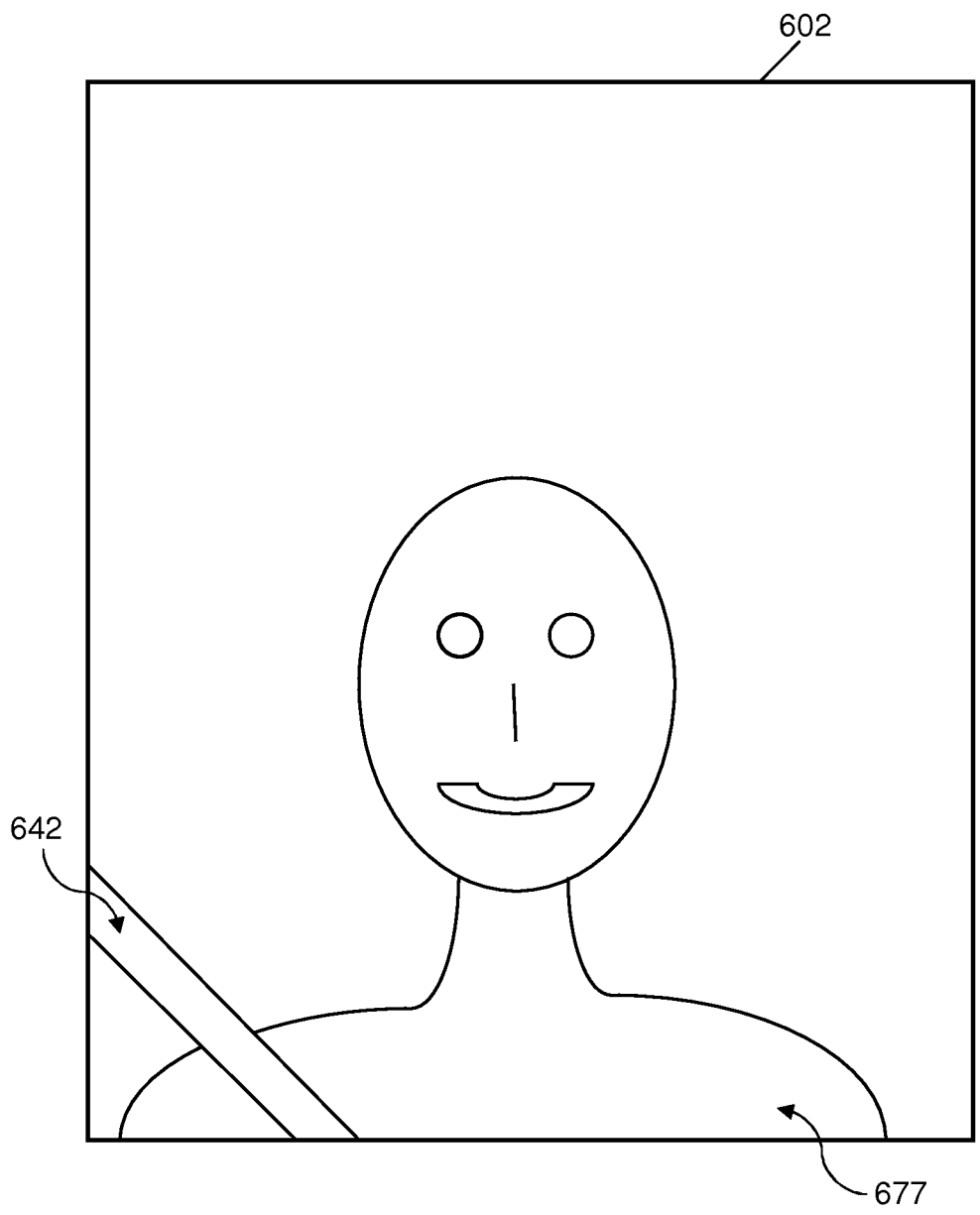

Reference is made to FIGS. 6A and 6B, which are schematic illustrations of two images 601 and 602 (respectively) acquired by a front-side camera of a phone, by a user seated in two different seats in a vehicle, in accordance with some demonstrative embodiments.

Each one of images 601-602 may show a portion of a human body 677, for example, a head and/or neck and/or shoulders and/or chest and/or arms, or a combination of other body parts or body regions or portions thereof.

Image 601 shows a vehicular seatbelt 641 located on the right side of image 601, crossing diagonally over the left shoulder of the human body 677, and appearing under and to the right of the human face. These characteristics are typical of a vehicular user that sits in a left-side seat of the vehicle, such the seatbelt crosses over his left shoulder.

In contrast, image 602 shows a vehicular seatbelt 642 located on the left side of image 602, crossing diagonally over the left shoulder of the human body 677, and appearing under and to the left of the human face. These characteristics are typical of a vehicular user that sits in a right-side seat of the vehicle, such the seatbelt crosses over his right shoulder.

The location and/or direction of the seatbelt may contribute to, or may lead to, a determination whether or not the phone user sits in a driver seat or in a passenger seat. For example, if the front-side camera of the phone captures an image which appears to be similar to image 602 (and not to image 601), then the phone may determine that the phone user sits on a right-side seat and thus is not the driver (of a vehicle in which the driver seat is on the left side, such as in the United States).

In some embodiments, a front-facing camera of the phone may capture an image of the user, which indicates that the user is below (or significantly below) a driving age. For example, the front-facing camera of the phone may capture an image of a child who clearly appears to be around eight or nine or ten years old. The phone may utilize an algorithm able to estimate the age, or age group or age range, of a pictured user (or pictured user's face), and may thus determine that the phone user clearly may not be the driver, due to his or her young age. Optionally, a user age estimator, or user age-range estimator, may be included in the phone. In some embodiments, the phone may take into account, for determining or estimating the age (or age range) of the user, one or more information items (e.g., date-of-birth, age, age range) that the user entered or supplied online or at Internet websites or to other applications (e.g., when checking-out at an online shopping process or website; when filling-out a personal profile of the user for a social network or for a web-mail account).

In some embodiments, the phone may estimate, determine, and/or take into account a speed (or rate) of texting or typing, as part of the analysis or decision-making process. For example, the phone may determine that the phone user typically types text at a rate of approximately 80 characters per minute; or that the phone user typically types text at a rate of 77 characters per minute when the phone is generally stationary and non-moving; whereas, the user of the phone is currently typing or entering text at a significantly slower pace or lower rate, for example, less than 50 percent or less than 40 percent or less than 30 percent or less than 25 percent than the user's typical speed or rate; optionally, together with identifying that the phone is currently moving at a speed of 48 miles per hour (e.g., based on GPS data or other location data). This may indicate that the phone user, who is typing significantly slower now, is probably driving a moving vehicle. In some embodiments, the phone may identify or take into account a stop or pause in typing (or in entering text), similarly pointing towards the possible determination that the user of the phone is driving while texting; particularly if such pauses or stops are not typical of that phone user in other scenarios (e.g., when the phone is substantially non-moving).

In some embodiments, the phone may take into account the location of one or more transmitters or illumination units which may be placed within a vehicle in order to assist the phone in determining whether or not the phone user is seated in the driver seat. For example, in some embodiments, a small red light may be installed at the vehicular ceiling over the driver seat, and a small green light may be installed at the vehicular ceiling over the front passenger seat. The phone may determine that it is closer to the red light, and thus the phone user sits in the driver seat. In other embodiments, multiple wireless transmitters or wireless transceivers may be installed within the car, in fixed or non-changing locations; and the phone may utilize a wireless receiver or a wireless transceiver of the phone in order to triangulate its position relative to such vehicular transmitter, and thereby determine the intra-vehicular position of the phone.

Some embodiments may be used by an enterprise, a corporate entity, a retailer, a trucking company, a moving company, a corporation that has a fleet of vehicles, a deliver company, a shipping company, or the like. For example, a shipping company may utilize some embodiments of the invention across most or all of the phone utilized by drivers of the shipping company; and may advertise that "We put safety first; all our drivers are equipped with cellular phones that prevent texting and driving". A supervisor within company may receive occurrence logs from all phones associated with the vehicular fleet of the company; may take disciplinary actions against drivers that are reported (by their phones) as performing unsafe and/or illegal operations (e.g., texting, emailing, browsing the Internet) while driving or while operating their vehicles; and may reward drivers who have a "clean" log of such unsafe and/or illegal occurrences.

Portions of the discussion herein may relate, for demonstrative purposes, to a "vehicular driver seat" or "vehicular driver's seat" under the assumption that such driver seat is located in the front-left side of a car or vehicle, as common in the United States or in most countries worldwide. However, the present invention may be used, with the suitable adjustments or modifications, to a vehicular driver seat which may be located in the front-right side of the car or vehicle, as common in the United Kingdom and other countries. It would be appreciated that some embodiments, which take into account right-side or left-side parameter or images or considerations, may be adjusted to such countries, for example, by flipping or substituting left-for-right and right-for-left, or by using a "mirror" image rather than a plain-captured image, or the like. In some embodiments, a phone may be able to autonomously and/or automatically recognize that the phone is being used in the United Kingdom or in other countries or regions in which a driver seat is typically in the front-right side of the cabin within a vehicle, for example, based on GPS data or other location data; and may automatically adjust or modify or configure its settings to perform the analysis based on flipped or mirrored images or considerations. In some embodiments, the phone user may indicate, or may be asked by the phone, in which country the phone is being used, and adjustments may be made accordingly. In some embodiments, similar adjustments may be made, regardless of the geographical location or country, for special vehicles in which the driver seat may be located in the front-right side of the vehicle; for example, in some types of delivery trucks, in some models of United States Postal Service mail delivery trucks, or the like.

Some portions of the discussion may relate, for demonstrative purposes, to detection, prevention, blocking and/or elimination of driving-and-texting. However, the present invention may be used in conjunction with detection, prevention, blocking and/or elimination of other operations which may be unsafe and/or undesired and/or illegal, for example, emailing-and-driving, utilizing a navigation application and driving, composing text and driving, gaming and driving, playing a game on a phone and driving, browsing the Internet and driving, downloading a file and driving, capturing photographs and/or video while driving, or the like.

Furthermore, the term "driving" as used herein may include any suitable verb or operation or functionality which may be performed or utilized by a driver or a vehicle operator, and may or may not include causing the vehicle to drive or to move. For example, the term "driving" may include steering, changing lanes, braking, slowing down, accelerating, decelerating, stopping, parking, driving forward, driving backward, driving in reverse, shifting gear(s), operating machinery or heavy machinery (e.g., in a tractor, bulldozer, crane, truck, dump-truck, garbage truck, or the like), performing auxiliary operations (e.g., receiving trip fare by a bus operator or taxi driver, dispensing monetary change by a bus operator or taxi driving, producing and/or giving a receipt or a ticket by a bus operator or a taxi driver), and/or other suitable operations.

Although portions of the discussions herein may relate, for demonstrative purposes, to a phone or cellular phone or smartphone able to block or restrict one or more of its features (e.g., texting, emailing, messaging, browsing) upon detecting that its user is driving a vehicle, some embodiments of the present invention may include other types of devices, electric devices, electronic devices, portable devices, or the like. Such devices may include, for example, portable electric or electronic devices, a portable gaming device, a handheld gaming device, an electric shaver, an e-book reader or electronic book reader, a personal organizer or PDA device, or other suitable devices.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" or "a plurality" as used herein include, for example, "multiple" or "two or more". For example, "a plurality of items" includes two or more items.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the machine-readable or computer-readable or device-readable medium may be or may include an electronic, magnetic, optical, electromagnetic, InfraRed (IR), or semiconductor system (or apparatus or device) or a propagation medium. Some demonstrative examples of a computer-readable medium may include a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks include Compact Disk—Read-Only Memory (CD-ROM), Compact Disk—Read/Write (CD-R/W), DVD, or the like.

In some embodiments, a data processing system suitable for storing and/or executing program code may include at least one processor or controller or circuitry which may be coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices or components (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Some embodiments may be implemented by software, by hardware, or by any combination of software and/or hardware as may be suitable for specific applications or in accordance with specific design requirements. Some embodiments may include units and/or sub-units, which may be separate of each other or combined together, in whole or in part, and may be implemented using specific, multi-purpose or general processors or controllers. Some embodiments may include buffers, registers, stacks, storage units and/or memory units, for temporary or long-term storage of data or in order to facilitate the operation of particular implementations.

Some embodiments may be implemented, for example, using a machine-readable medium or article which may store an instruction or a set of instructions that, if executed by a machine, cause the machine to perform a method and/or operations described herein. Such machine may include, for example, any suitable processing platform, computing platform, computing device, processing device, electronic device, electronic system, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit; for example, memory, removable or non-removable media, erasable or non-erasable media, writeable or re-writeable media, digital or analog media, hard disk drive, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. Accordingly, the claims are intended to cover all such modifications, substitutions, changes, and equivalents.

What is claimed is:

1. A phone comprising:
a wireless transceiver to send and receive wireless communication signals;
a camera to capture one or more images; and
a processor to execute code;
wherein the processor is (a) to make a determination that a user of the phone is sitting in a driver seat of a moving vehicle, by taking into account an image analysis of an image captured by said camera, wherein the image analysis takes into account a slanting of a vehicular component which appear in said image and (b) based on the determination, to block one or more features of the phone.

2. The phone of claim 1, wherein the processor is to determine that the user of the phone is sitting in the driver seat of the vehicle based on analysis of one or more images captured by said camera.

3. The phone of claim 1, wherein said camera comprises a back-side camera, and wherein the processor is to determine that the user of the phone is sitting in the driver seat of the vehicle based on an analysis of one or more images captured by said back-side camera.

4. The phone of claim 3, wherein the analysis takes into account a determination of whether or not the one or more images captured by the back-side camera comprise one or more vehicular components which are typically visible from a vehicular driver seat and which are typically non-visible from a vehicular passenger seat.

5. The phone of claim 1, wherein said camera comprises a front-side camera, and wherein the processor is to determine that the user of the phone is sitting in the driver seat of the vehicle based on an analysis of one or more images captured by said front-side camera.

6. The phone of claim 5, wherein the analysis takes into account a determination of whether or not the one or more images captured by the front-side camera comprise one or more vehicular components which are typically visible from a vehicular driver seat and which are typically non-visible from a vehicular passenger seat.

7. The phone of claim 5, wherein the analysis takes into account a characteristic of a vehicular seatbelt which appears in at least one image captured by the front-side camera.

8. The phone of claim 1, wherein the processor is to determine that the user of the phone is seating in a driver seat of a vehicle based on a contextual analysis of one or more text messages exchanged by the user.

9. The phone of claim 1, further comprising a microphone to capture audio; wherein the processor is to determine that the user of the phone is sitting in the driver seat of the vehicle based on a contextual analysis of one or more utterances in a phone conversation between the user of the phone and a remote person.

10. The phone of claim 1, further comprising a microphone to capture ambient audio; wherein the processor is to determine that the user of the phone is sitting in the driver seat of the vehicle based on a contextual analysis of one or more utterances in a non-cellular conversation between the user of the phone and a nearby person.

11. The phone of claim 1, wherein the processor is to determine that the user of the phone is sitting in the driver seat of said moving vehicle, by taking into account an image analysis of an image captured by said camera; wherein the image analysis indicates that the image comprises a portion of a vehicular dashboard that is visible exclusively from the driver seat.

12. The phone of claim 1, wherein the processor is to determine that the user of the phone is sitting in the driver seat of said moving vehicle, by taking into account an image analysis of an image captured by said camera; wherein the image analysis takes into account one or more extra-vehicular items which appear in said image.

13. The phone of claim 1, wherein the processor is to block the one or more features of the phone unless the user of the phone overrides the blocking by performing at least one of: (a) responding positively to a confirmation question presented to the user; (b) correctly providing a pre-defined password; (c) uttering a pre-defined phrase of speech in response to a confirmation question.

14. The phone of claim 1, wherein the processor is to update a log which tracks occurrences of concurrent driving and texting.

15. The phone of claim 1, wherein the processor is to send, to a recipient external to the phone, a notification about one or more occurrences of concurrent texting-and-driving at said phone.

16. The phone of claim 1, wherein the processor is to automatically initiate a process which entails a negative monetary consequence for the user of the phone due to concurrent texting and driving detected by the phone.

17. The phone of claim 1, wherein the processor is to automatically initiate a process which entails a reward for the user of the phone due to refraining from concurrent texting and driving for a predefined time period.

18. The phone of claim 1, wherein the processor is to determine that the user of the phone is sitting in the driver seat of the moving vehicle based on an incoming wireless communication signal received from a remote server which performed an analysis of data related to utilization of said phone.

19. A portable electronic device comprising:
a wireless transceiver to send and receive wireless communication signals;
a camera to capture one or more images; and
a processor to execute code;
wherein the processor is (a) to make a determination that a user of the portable electronic device is sitting in a driver seat of a moving vehicle, by taking into account an image analysis of an image captured by said camera, wherein the image analysis takes into account a slanting of a vehicular component which appear in said image; and (b) based on the determination, to block one or more features of the portable electronic device.

20. A portable electronic device comprising:
a wireless transceiver to send and receive wireless communication signals;
a camera to capture one or more images; and
a processor to execute code;
wherein the processor is (a) to make a determination that a user of the portable electronic device is sitting in a driver seat of a moving vehicle based on an analysis of one or more images captured by said camera, wherein the analysis takes into account a characteristic of a vehicular seatbelt which appears in at least one image captured by said camera, and (b) based on the determination, to block one or more features of the portable electronic device.

* * * * *